US012105725B2

(12) United States Patent
Laraki et al.

(10) Patent No.: US 12,105,725 B2
(45) Date of Patent: Oct. 1, 2024

(54) AUTOMATIC DETERMINATION OF ALTERNATIVE PATHS FOR A PROCESS FLOW USING MACHINE LEARNING

(71) Applicant: Salesforce, Inc., San Francisco, CA (US)

(72) Inventors: Zineb Laraki, Atherton, CA (US); Penny Tselikis, San Francisco, CA (US); Till Christian Bergmann, San Mateo, CA (US); Michael Weil, New York, NY (US); Christian Posse, Belmont, CA (US); Jason Teller, Arcadia, CA (US); Alex Edelstein, San Francisco, CA (US); Sarah Joann Aerni, San Francisco, CA (US); Mehmet Ezbiderli, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 57 days.

(21) Appl. No.: 17/589,778

(22) Filed: Jan. 31, 2022

(65) Prior Publication Data

US 2023/0244686 A1 Aug. 3, 2023

(51) Int. Cl.
*G06F 16/25* (2019.01)
*G06F 16/23* (2019.01)
*G06F 16/2457* (2019.01)
*G06N 20/00* (2019.01)

(52) U.S. Cl.
CPC ............ *G06F 16/254* (2019.01); *G06F 16/23* (2019.01); *G06F 16/2457* (2019.01); *G06N 20/00* (2019.01)

(58) Field of Classification Search
CPC .... G06F 16/254; G06F 16/23; G06F 16/2457; G06N 20/00
USPC .......................................................... 707/602
See application file for complete search history.

(56) References Cited

U.S. PATENT DOCUMENTS

| 2017/0076012 | A1* | 3/2017 | Sreenivasa | ............ G06F 16/907 |
| 2019/0068627 | A1* | 2/2019 | Thampy | .............. H04L 63/1425 |
| 2019/0377815 | A1* | 12/2019 | Karlberg | ................. G06F 16/29 |
| 2020/0160230 | A1* | 5/2020 | Wang | ..................... G06N 5/025 |
| 2020/0264860 | A1* | 8/2020 | Srinivasan | ................ G06F 8/71 |
| 2020/0344109 | A1* | 10/2020 | Shil | ..................... H04L 41/0233 |
| 2021/0264332 | A1* | 8/2021 | Pingali | ..................... G06N 3/08 |
| 2022/0092063 | A1* | 3/2022 | Patthak | ................. G06F 16/248 |

* cited by examiner

*Primary Examiner* — Hosain T Alam
*Assistant Examiner* — Saba Ahmed
(74) *Attorney, Agent, or Firm* — Holland & Hart LLP

(57) ABSTRACT

Methods, systems, apparatuses, devices, and computer program products are described. A system may identify, from an event log including log entries for a tenant of a multi-tenant database system, a pattern of log entries corresponding to main actions and satisfying a frequency threshold. The system may identify log entries associated with the pattern and corresponding to the main actions, detailed actions, or both. The system may retrieve data corresponding to a history field of a data object associated with the pattern and may determine at least a portion of a process flow for the data object according to the pattern and based on the log entries and the historical data. The process flow may include operations to perform using the data object. In some cases, the system may transmit, to a user device, an indication of the portion of the process flow for user review and implementation.

20 Claims, 12 Drawing Sheets

AUTOMATIC DETERMINATION OF ALTERNATIVE PATHS FOR A PROCESS FLOW USING MACHINE LEARNING

FIELD OF TECHNOLOGY

The present disclosure relates generally to database systems and data processing, and more specifically to automatic determination of alternative paths for a process flow using machine learning.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems that are used to track detailed records of actions performed within the systems by users. For example, a multi-tenant database system may store data tracking the actions performed by users corresponding to different tenants within the multi-tenant database system. However, generic process mining procedures may fail to leverage the structure of such data, resulting in inefficient or ineffective process mining techniques.

DETAILED DESCRIPTION

Figure 1:
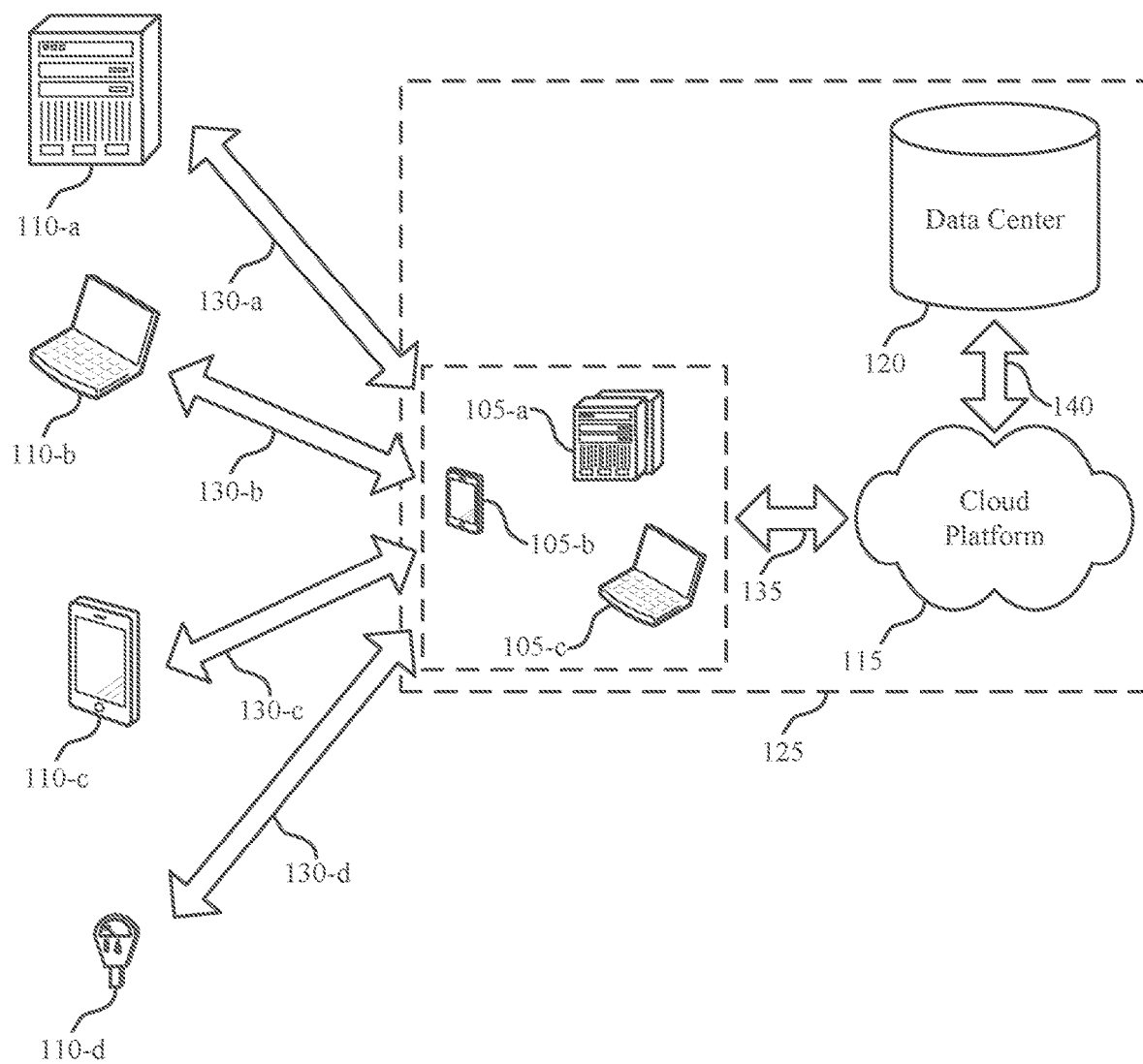
FIG. 1 illustrates an example of a data processing system for cloud computing that supports automatic determination of alternative paths for a process flow using machine learning in accordance with aspects of the present disclosure.

In some systems, a database (e.g., a multi-tenant database system associated with a cloud platform) may automatically store detailed records tracking actions performed within a system. For example, a database system may store, for individual data objects, a history field tracking actions performed on a respective data object. In some examples, a user may use the history field to identify the users who have performed an action on a respective data object, a time at which an action was performed, and other information associated with the action. In addition, the database system may store, in an event log, log entries tracking the actions performed (e.g., on different data objects) across the system. The actions may include creating, editing, or saving an account, sending an email or a short message service (SMS) message, or any combination of these or other activities that a user may perform within the system (e.g., on a data object or otherwise).

Techniques described herein support process mining within a database system to automatically determine paths for process flows, where the process mining techniques may leverage the specific data structure of a multi-tenant database system (e.g., specific data schemas for the history fields, log entries, or both). For example, the database system may store an event log including log entries that may be classified using a layered taxonomy. In some cases, the layered taxonomy may be a two-layer taxonomy, in which events are classified as either main actions (e.g., actions selected by users for the system to perform) or detailed actions (e.g., automated actions or actions defining detailed aspects of a main action). In some examples, the process mining may include searching for frequent patterns in the event log by filtering using the layered taxonomy (e.g., searching for patterns between the "main action" log entries). That is, the detailed actions may be filtered out from the main actions to support efficient pattern detection in the event log. In some cases, the database system may identify log entries (e.g., main action log entries, detailed action log entries, or a combination thereof) associated with the pattern, where the pattern may correspond to a data object in the database system. For example, the pattern may include actions performed on a specific data object type.

In some examples, the process mining procedure may involve the database system retrieving data from a history field for the data object corresponding to the pattern, and the database system may use the identified log entries and the historical data for the data object to determine at least a portion of a process flow (e.g., a new operation in the flow, a new path for the flow, or a completely new flow). The process flow (e.g., a workflow) may include one or more operations to perform using the data object. The database system may surface the determined portion of the process flow to a user for review, implementation, or both. Leveraging the data structure of the log entries and the historical data may increase the efficiency and effectiveness of the process mining techniques. For example, filtering using the specific layered taxonomy may reduce processing resources and latency involved in pattern detection, while using the detected pattern to determine related actions across layers (e.g., detailed actions and main actions) may capture detailed patterns and events, supporting identification of more effective process flows. Additionally or alternatively, using the combination of the event log and the history fields of data objects may support improved pattern recognition and event identification, supporting the identification of processes that involve multiple different users, multiple different data objects, multiple different actions, or any combination thereof.

Aspects of the disclosure are initially described in the context of an environment supporting an on-demand database service. Aspects of the disclosure are then described in the context of computing architectures, discovery procedures, user interfaces, and process flows. Aspects of the disclosure are further illustrated by and described with reference to apparatus diagrams, system diagrams, and flowcharts that relate to automatic determination of alternative paths for a process flow using machine learning.

FIG. 1 illustrates an example of a data processing system 100 for cloud computing that supports automatic determination of alternative paths for a process flow using machine learning in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support customer relationship management (CRM) solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

One or both of the cloud platform 115 and the subsystem 125 may include a database system (e.g., a multi-tenant database system) which may support specific process mining techniques for automatically determining paths for process flows. As described herein, the database system may support systems which track detailed records of actions performed within the systems. For example, the database system may store, for individual data objects, a history field tracking actions performed on the respective data object. The history field may be stored at the data center 120. In some examples, a user (e.g., a cloud client 105, a contact 110) may use the history field to identify past users (e.g., cloud clients 105, contacts 110) who may have performed an action on a respective data object, a time at which an action was performed, or other information associated with the action. In addition, the database system may store, in an event log (e.g., at the data center 120), log entries tracking the actions performed across the systems. The actions may include creating, editing, or saving a data object, sending an email or an SMS message, or any combination of these or other activities that a user may perform, for example, on a data object or otherwise within the database system.

In some cases, the database system may store log entries tracking the actions performed across the system in an event log, where the log entries may support mining of the data for interesting patterns and process flow paths. However, some systems may fail to leverage the structure of data in the log entries and the history fields, resulting in inefficient or ineffective process mining techniques. For example, some other systems may perform process mining on all log entries in the event log, which may be resource intensive and introduce workflow inefficiencies. Furthermore, failing to leverage the specific data schemas may limit the patterns that can be detected, for example, by failing to determine patterns across users, data objects, actions, or the like.

In contrast, the data processing system 100 supports process mining for automatically determining paths for process flows, where the process mining techniques may leverage a specific data structure of a multi-tenant database system (e.g., specific data schemas for the history fields and log entries). For example, the data processing system 100 may store an event log including log entries that may be classified as either main actions (e.g., actions selected by users to perform) or detailed actions (e.g., automated actions or actions defining detailed aspects of a main action). In some examples, the process mining may include searching for frequent patterns in the event log between "main action" log entries. That is, the detailed actions may be filtered out from the main actions. In some cases, the data processing system 100 may identify log entries (e.g., main action log entries, detailed action log entries, or a combination thereof) associated with the pattern, where the pattern may correspond to a data object in the data processing system 100. For example, the pattern may include actions performed on a specific data object type.

In some examples, the data processing system 100 may retrieve data from the data processing system 100 (e.g., the data center 120) corresponding to a history field of the data object corresponding to the pattern, and the data processing system 100 may use the identified log entries and the historical data for the data object history field to determine at least a portion of a process flow (e.g., a new operation in a process flow, a new path for a process flow, or an entirely new process flow). In some examples, the data processing system 100 may surface the determined portion of the process flow to a user (e.g., a cloud client 105, a contact 110) for review, implementation, or both. Leveraging the data structure of the log entries and the historical data may increase efficiency and effectiveness of the process mining techniques, reduce processing resources and latency involved in pattern detection, and support more robust identification of updates to process flows (e.g., across users, data objects, data object types, actions, or any other parameters).

In some examples, an organization may use the process mining techniques described herein for a fully-automated or guided process that is used to perform a task (e.g., in which steps may be sequentially executed). For example, the process mining techniques may be utilized for an invoicing system. After an invoice is entered into the system, a user may perform automatic determination of alternative paths for a process flow to define new processes which may improve the invoicing system. That is, instead of routing an invoice record using an established automated process or using a manual collection process that may differ for each invoice record, the process mining system may use an A/B test framework to measure different paths of a process flow (e.g., routes) against a set of defined key performance indicators (KPIs). Instead of routing every invoice record to either A or B, the process mining system may introduce new operations and new paths into the process flow based on the pattern mining, which may be more efficient than the existing A or B routes.

Automatic determination of alternative paths for a process flow may support improved efficiency and improved effectiveness of process mining techniques. For example, as the techniques support identifying a pattern of log entries corresponding to main actions in an event log, the techniques may support increased efficiency of process mining as the log entries are filtered. As another example, as the techniques described herein support determining a new operation or a new path in a process flow, the techniques may support improving the effectiveness of process flows (e.g., workflows) as the new operation or the new path may better optimize one or more KPIs of the process flow.

It should be appreciated by a person skilled in the art that one or more aspects of the disclosure may be implemented in a data processing system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
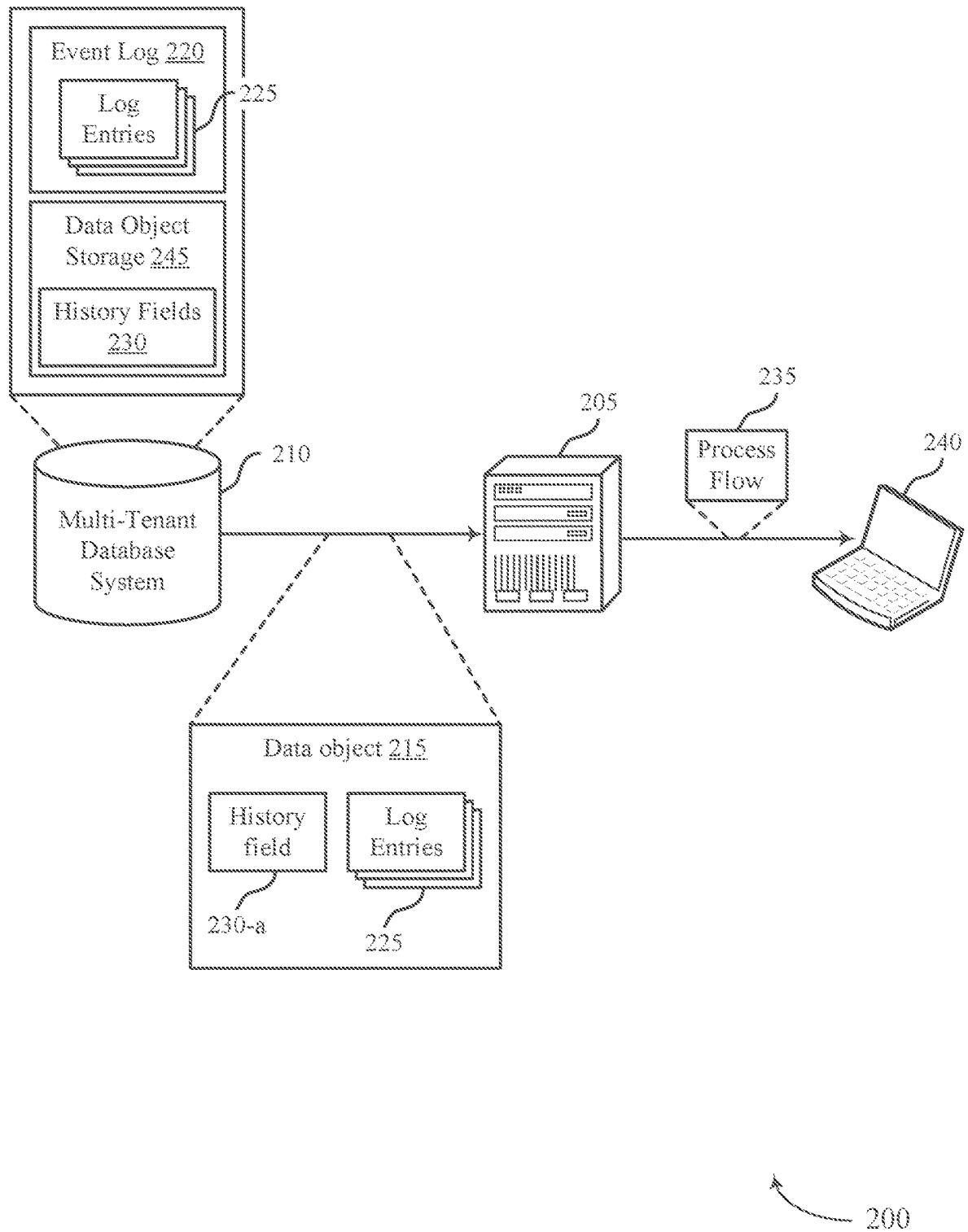
FIG. 2 illustrates an example of a computing architecture that supports automatic determination of alternative paths for a process flow using machine learning in accordance with aspects of the present disclosure.

FIG. 2 illustrates an example of a computing architecture 200 that supports automatic determination of alternative paths for a process flow using machine learning in accordance with aspects of the present disclosure. The computing architecture 200 may implement or be implemented by aspects of the data processing system 100. For example, the computing architecture 200 may include a process mining system 205 operating in a multi-tenant database system 210, which may be implemented by aspects of a cloud platform 115 or a subsystem 125 described with reference to FIG. 1. The multi-tenant database system 210 may be an example of any data storage system, including cloud resources, database resources, or any other resources. The process mining system 205 may be any device configured for performing process mining procedures, such as an application server, a database server, a cloud-based server, a server cluster, a virtual machine, a container, or any combination of these or other devices or device components supporting data processing.

As described herein, the computing architecture 200 may support systems which track detailed records of actions performed within a platform (e.g., a customer relationship management (CRM) platform or other data management platform). For example, the multi-tenant database system 210 may store an event log 220. The event log 220 may store multiple log entries 225 for a tenant of the multi-tenant database system 210 (e.g., the event log 220 may be tenant-specific or may keep event data for each tenant siloed from other tenant data). In some cases, the event log 220 may track actions performed by users associated with the tenant, and the event log 220 may be automatically updated based on a user performing an action in the multi-tenant database system 210. The log entries 225 may track event records that capture customer behavior, implicit feedback, and user activities and actions performed on different data objects or otherwise performed across the multi-tenant database system 210. For example, a log entry 225 may track actions such as searching a website, typing into a field, logging into a user account, creating a user account, creating a data object, editing a data object, saving a data object, sending an email, sending a calendar invite, sending an SMS message, searching a webpage, clicking on a link, or any other activities that a user may perform within a platform (e.g., such as activities performed on a data object 215). In addition, a log entry 225 may include a set of fields which may indicate information relating to a respective event, such as a data object type, a specific data object of the data object type (e.g., the data object 215), a timestamp for the event, a user identifier (e.g., corresponding to the user who performed the event triggering creation of the log entry 225), a client session identifier, an event classification, or any combination thereof.

In some examples, the process mining system 205 may leverage a multi-layer taxonomy of events to determine paths of a process flow. For example, the taxonomy may be an N-layer taxonomy, with any quantity of classifications for events to support different granularities of filtering, analysis, or both. Alternatively, in some other examples, the process mining system 205 may leverage a single-layer taxonomy of events to determine paths of a process flow, such that pattern detection is performed across the events of the event log 220. A process flow may include multiple paths through which the data object 215 may flow, with each path including different operations (e.g., actions, events) to perform on or using one or more data objects 215. Put another way, a process flow may include any automated or user-guided process that an organization may implement to perform a task based on a data input. For example, a process flow for collecting an invoice may include operations of receiving an invoice record and routing the invoice record through a particular process.

In some cases, the process mining system 205 may leverage a two-layer taxonomy of events, where an action associated with a log entry 225 may be classified as a main action or a detailed action (e.g., defining the two layers). A main action may include a primary action performed on a data object by a user, such as a creation of a data object, an edit to a data object, a save process, and the like. As such, main actions may provide a relatively high-level summary of the log entry 225. In addition, each main action may have one or more corresponding detailed actions. Detailed actions may indicate specific information relating to and supporting the main action, such as how the main action was performed. For example, if a main action is the creation of an account object, corresponding detailed actions may include instantiating data values for the account object, the user entering information associated with the account object, adding features to the account object, and other actions involved in the creation of the account object. In another example, if a main action includes editing an account object, then corresponding detailed actions may specify what fields were specifically edited. As such, the event log 220 may include relatively more log entries 225 categorized as detailed actions than as main actions.

Some systems (e.g., the process mining system 205) may perform pattern detection using a specific layer of the multi-layer taxonomy. For example, the process mining system 205 may search for common patterns of events (e.g., patterns of events occurring in the event log a quantity of times satisfying a threshold for pattern detection or the relatively most frequent patterns of events compared to other patterns occurring in the event log) across log entries classified as main actions. The process mining system 205 may determine a set of main actions corresponding to the detected pattern. In some examples, the process mining system 205 may further determine log entries classified as detailed actions corresponding to the pattern. The detailed actions may be determined within a time window (e.g., a time window defined by the main actions in the detected pattern) and based on a same one or more users, a same one or more data objects, or both as the main actions. For example, if a main action in a pattern is performed on a specific data object or by a specific user, the process mining system 205 may search for detailed actions relatively close in time (e.g., within the time window) performed on the specific data object, performed by the specific user, or both that are common across multiple instances of the detected pattern (e.g., satisfying a threshold frequency). In some cases, the time window may extend beyond a first main action in the pattern, a last main action in the pattern, or both to detect detailed actions related to the pattern that occur prior to or following the main actions of the pattern. In some examples, the process mining system 205 may use any multi-layer taxonomy, including a two or more-layer taxonomy, or no taxonomy (e.g., all actions may be considered as equal).

In addition to the event log 220, the multi-tenant database system 210 may include data object storage 245. The data object storage 245 may store multiple data objects 215 of one or more data object types, including respective history fields 230 for the data objects 215. For example, the multi-tenant database system 210 may additionally store, for a data object 215, a history field 230 tracking actions performed on or using the data object 215. The history field 230 may store chronological records of actions performed on the data object 215 and may include a set of fields. The set of fields may indicate a field of the data object (e.g., a field affected by the action), a timestamp (e.g., at which time the action was processed), a user identifier (e.g., corresponding to the user who triggered the action), an original value for the field (e.g., before the action was performed), a current value for the field (e.g., after the action is performed), or any combination thereof. As such, the history field 230 for a data object 215 may track each action affecting the data object 215 from creation of the data object 215 to a current state of the data object 215. In some examples, log entries 225 created for actions performed on the data object 215 may be additionally stored in the history field 230 of the data object 215. The history field 230 may retrieve the applicable log entries 225 based on a uniform resource locator (URL) of the data object 215 (e.g., which is a field of the log entries 225). The history fields 230 may be automatically updated based on a user performing an action on a data object 215 in the multi-tenant database system 210.

The history field 230 for a data object 215 may indicate past users who have performed an action on the data object 215, a timestamp, a description of the action, and the like. That is, the history field 230 may store a history of actions performed on the data object 215, and the actions may each be associated with one or more log entries 225 in the event log 220. The history field 230 may track main actions, detailed actions, or a combination thereof. In some examples, a user may use the history field 230 to identify a sequence of events associated with the data object 215. For example, for data objects with a relatively long history, the history field 230 may be a valuable asset in understanding how changes were made to the particular data object and by which users.

In some examples, the process mining system 205 may use the specific data structure of the multi-tenant database system 210, including the event log 220 and the history fields 230, in process mining to automatically determine paths for process flows 235. By utilizing the specific data structure, the process mining system 205 may perform efficient mining of data and identify patterns and other features of the data, which may optimize—or otherwise improve the performance of—a portion of a process flow 235. In some examples, the process mining system 205 may identify a pattern of log entries 225 from the event log 220 corresponding to main actions and satisfying a frequency threshold within the event log 220, which may enable the process mining system 205 to separate meaningful actions from noise (e.g., variance) in the data. The frequency threshold may specify a quantity of occurrences of a pattern within a time period in order for the pattern to be detected. For example, if a specific pattern of actions is determined to have occurred greater than the frequency threshold (e.g., ten times, one hundred times), the process mining system 205 may identify this as a detected pattern. Additionally or alternatively, the frequency threshold may specify a top K number of patterns or K percentage of patterns, where the detected patterns are the most frequent patterns relative to the other patterns in the event log 220 (e.g., the 10 most frequent patterns, the top 5% of patterns by frequency). The process mining system 205 may identify frequently repeated patterns of actions (e.g., most used actions), which may be better suited for automation in the process flow than unique, less frequent actions or patterns of actions that may be manually implemented by a user.

In some cases, the process mining system 205 may identify the pattern of log entries based on filtering the log entries 225. For example, to discover patterns in the event log 220, or to discover common actions performed on the data object 215 in a particular order, the process mining system 205 may optimize the discovery process by first filtering the log entries 225. In some examples, the process mining system 205 may filter the log entries 225 based on a set of users who perform a majority of the activities on the data object 215 (e.g., a set of power users). For example, the process mining system 205 may identify a top K quantity of users or a top K percentage of users performing activities in the event log 220 or on the data object 215. That is, the process mining system 205 may define a threshold quantity of users or a threshold percentage of users to be assigned as "power users," where the power users are the users with the most log entries 225 in the event log 220, the most main action log entries 225 in the event log 220, the most log entries 225 corresponding to the data object 215 in the event log 220, or any combination thereof. The process mining system 205 may identify the pattern of log entries from the log entries 225 associated with the identified "power users." That is, the process mining system 205 may reduce noise in the event log 220 by reducing the log entries 225 of interest through filtering (e.g., by power users).

Additionally or alternatively, the process mining system 205 may filter the log entries 225 for pattern detection based on a set of data objects or data object types which were associated with a majority of the activities. For example, the process mining system 205 may identify a top K quantity of data objects or data object types or a top K percentage of data objects or data object types on which activities are performed in the event log 220. That is, the process mining system 205 may define a threshold quantity of data objects or data object types or a threshold percentage of data objects or data object types to be assigned as "frequent objects," where the frequent objects are the data objects or data object types with the most log entries 225 in the event log 220, the most main action log entries 225 in the event log 220, the most log entries 225 corresponding to power users in the event log 220, or any combination thereof. The process mining system 205 may identify the pattern from log entries 225 associated with the one or more frequent data objects or data object types. For example, the process mining system 205 may determine a relatively large quantity of the log entries 225 relate to case objects (e.g., case objects may be in the top 5 most frequently accessed data object types or the top 5% of most frequently accessed data object types in the event log 220) and may filter the log entries 225 to detect patterns in the actions relating to case objects. Additionally or alternatively, the process mining system 205 may filter by specific data objects (e.g., log entries 225 relating to a specific case object, "Case_1").

In some examples, the process mining system 205 may filter the log entries 225 based on multiple criteria. For example, the process mining system 205 may leverage the set of users (e.g., power users) and the data object types (e.g., the frequent data object types) together or separately to filter the log entries 225. Additionally or alternatively, the process mining system 205 may use other filtering criteria, such as filtering by classification (e.g., by main actions or detailed actions), type of action (e.g., record creation, record modification), group of users (e.g., administrative users, salesmen), or the like. By filtering the log entries 225 before identifying the pattern of log entries 225, the process mining system 205 may perform the process mining techniques as described herein on a subset of log entries 225 instead of the full event log 220, significantly reducing the processing overhead and latency associated with pattern detection.

In some cases, the process mining system 205 may identify one or more log entries 225 from the event log 220 associated with the pattern of log entries (e.g., that follows the pattern). The one or more log entries 225 may include log entries corresponding to main actions, detailed actions, or any combination thereof. For example, the one or more log entries 225 may include a main action corresponding to an edit of the data object 215 and one or more corresponding detailed actions indicating what specific information was edited, where the main action and the one or more detailed actions may be included in the pattern of log entries. In some examples, the pattern may initially be detected based on the main actions, but the full pattern may include the main actions and related detailed actions. For example, a detected pattern may include a user logging in (e.g., a first main action), creating a opportunity data object (e.g., a second main action), and updating an account relating to the opportunity data object (e.g., a third main action). The process mining system 205 may detect this pattern and then determine any additional related actions, such as a pattern in detailed actions relating to the user login, the opportunity data object, the related account, or any combination thereof. These related actions may occur between the first main action and the third main action, before the first main action, after the third main action, or any combination thereof. Based on the detected pattern, the process mining system 205 may determine a time window for analysis and may search for further aspects of the pattern in log entries 225 that have timestamps within the determined time window. The process mining system 205 may determine the time window using a rule (e.g., searching between one minute prior to the first main action and one minute following the last main action), machine learning (e.g., learning relevant time windows for analysis), or some other procedure.

Upon identifying the log entries 225 associated with the pattern, the process mining system 205 may determine one or more data objects associated with the pattern (e.g., affected by at least one of the actions in at least one instance of the detected pattern). The process mining system 205 may retrieve data corresponding to the history field 230-a of a determined data object 215 associated with the pattern. The data (e.g., historical data) may include the history of actions (e.g., main actions and detailed actions) performed on the data object 215, and the process mining system 205 may retrieve the data based on the history field 230-a being linked to the data object 215. In some cases, the process mining system 205 may retrieve a subset of historical data associated with timestamps corresponding to the detected pattern. Additionally or alternatively, the process mining system 205 may retrieve the subset of historical data based on the historical data in the history field 230-a corresponding to log entries 225 in the event log 220 associated with the pattern. In some examples, the history field 230-a may indicate one or more log entries 225 associated with the pattern that are also associated with main actions, detailed actions, or both performed on the data object 215. In some examples, the process mining system 205 may leverage the specific data structure described herein to retrieve historical data from the history field 230-a that is associated with the pattern of log entries 225, and thus may be better suited for automation, rather than retrieving all log entries 225 or historical data corresponding to the data object 215, which may include noise and other variations. The process mining system 205 may further refine the pattern based on the historical data accessed from the history field 230-a. For example, the process mining system 205 may determine additional aspects of the pattern, or may modify the detected pattern based on historical information from the related data objects 215. Additionally or alternatively, the process mining system 205 may use the historical information to determine one or more aspects of a process flow 235.

In some examples, based on the one or more log entries 225 associated with the pattern and the data of the history fields 230, the process mining system 205 may automatically determine at least a portion of a process flow 235 for the data object 215 according to pattern. That is, the process mining system 205 may determine that the log entries 225 associated with the pattern may correspond to operations that may add value if added to the portion of the process flow 235. Using the process mining techniques described herein, the process mining system 205 may discover and suggest an alternative portion of the process flow 235 including alternative operations that may increase the efficiency of the process flow 235 in some way. In some examples, the multi-tenant database system 210 may transmit an indication of the portion of the process flow 235 to a user device 240. A user may determine whether or not to use the indicated portion of the process flow 235 and may indicate, via a user interface of the user device 240, a selection of the portion of the process flow 235. The multi-tenant database system 210 may update the process flow 235 accordingly to include the portion of the process flow 235 if selected by the user. For example, the multi-tenant database system 210 may store and support one or more process flows (e.g., as workflows), which may automate aspects of the process flows, provide reminders for aspects of the process flows, or both. Such process flows may improve the consistency and reliability of operations performed in the multi-tenant database system 210 across users of a tenant.

In some cases, the process mining system 205 may determine variants of the process flow 235 and may perform A/B testing to select a variant to surface to the user. For example, the process mining system 205 may determine a set of variants corresponding to the pattern of log entries, the variants including one or more shared actions, one or more shared data object types, one or more shared users, or a combination thereof. That is, the process mining system 205 may identify multiple variants of the pattern (e.g., a first user may perform the actions of the pattern in a first order or using a first set of inputs, while a second user may perform the actions in a second order or using a second set of inputs). The variants may accomplish the same or similar objectives, but may differ at the log entry-level, the history field-level, or both. The process mining system 205 may select a variant based on a selection parameter, which may include a time to perform the variant, an accuracy metric associated with the variant, or both. In addition, the selection parameters may include any other business-relevant metric, for example, improved traceability for auditing purposes. The process mining system 205 may determine at least the portion of the process flow 235 based on the selected variant. In some cases, the variant may be A/B tested and optimized before the portion of the process flow 235 is determined. Additionally or alternatively, the process mining system 205 may transmit additional data associated with the set of variants to the user device 240. The data may indicate respective gain information for one or more variants of the set of variants based on the selection parameter. For example, the gain information may indicate how the process flow may be improved by modifying the flow to include the variant. In some cases, the gain information may show a relative improvement in latency, processing overhead, memory overhead, reliability, or any other metric. The user or the process mining system 205 may select a variant to implement within the multi-tenant database system 210 based on one or more of the metrics (e.g., by comparing the metrics).

In some examples, the process mining system 205 may perform process mining in the background (e.g., as background processes, during relatively low-usage times) and may search for any patterns for analysis (e.g., independent of user input). Additionally or alternatively, a user may trigger a process mining activity. For example, the user may request analysis of processes associated with a specific user or set of users, a specific data object type, a specific existing process flow (e.g., workflow), or some combination thereof. The process mining system 205 may trigger an alert or response when a pattern of log entries is detected that satisfies a particular threshold (e.g., matching a user's selection criteria or otherwise). Put another way, the user may request for the process mining system 205 to analyze a particular data object or a particular process flow for pattern mining based on a metric the user may intend to optimize (e.g., a gain time of 10%, an accuracy gain of 10%). In some examples, the process mining system 205 may receive a request to analyze the data object 215, the process flow 235, or both from the user device 240. The process mining system 205 may identify a pattern of log entries based on the request.

If the process mining system 205 determines a new portion of a process flow 235 (e.g., an alternative operation, an alternative path, an alternative process flow), the process mining system 205 may add an additional action to the process flow, an additional path of actions to the process flow, an additional process flow, or any combination thereof. In some examples, the additional action, the additional path of actions, or both may be added to any portion of an existing process flow 235. Additionally or alternatively, the process mining system 205 may add a new process flow 235 (e.g., workflow) to the multi-tenant database system 210 based on determining the portion of the process flow 235.

The multi-tenant database system 210 may use the new or updated process flow 235 as a result of the process mining procedure. For example, the process mining system 205 may detect a first action corresponding to an initial step of a process flow and may perform one or more additional actions corresponding to steps of the process flow in response to detecting the first action, where the one or more additional actions include at least the portion of the process flow 235. For example, the process flow may trigger automated actions in the multi-tenant database system 210 to follow a determined pattern or may trigger one or more reminder messages to a user operating a user device 240 to perform one or more actions according to the determined pattern.

The process mining techniques described herein may occur within the multi-tenant database system 210 itself such that the log entries 225, the historical data in the history fields 230, or both may be secure. For example, the process mining system 205 may be a component of the multi-tenant database system 210 and may identify the pattern of log entries and determine at least the portion of the process flow 235 internal to the multi-tenant database system 210, where the process mining system 205 may access the event log 220 and the history fields 230 of the relevant data objects 215 according to a security policy of the multi-tenant database system 210.

As an example of a process mining procedure, the process mining system 205 may detect a pattern associated with a contact creation and validation method (e.g., an account touch). In some examples, a first user may receive a request to create a contact, for example, for validation or data-quality profiling. The first user may assign one or more other users (e.g., a second user) to create a case for one or more accounts in the multi-tenant database system 210. In some examples, the second user may search for contacts for the one or more accounts using resources external to the multi-tenant database system 210 (e.g., a company website, a search engine). The second user may create a log entry 225 in the event log 220 associated with a call for the contacts. In addition, the second user may validate whether corresponding contact information (e.g., an email address, a phone number) is up to date. After a threshold number of contacts are created for the initial request, the second user may notify the first user that the task is complete, and the corresponding case may be closed. The process mining system 205 may detect this pattern of actions (e.g., by using the main actions and then identifying relevant detailed actions). The process mining system 205 may determine relevant historical information from corresponding history fields 230 in the data object storage 245 to use for determining one or more processes to perform in the account touch process flow. The process mining system 205 may suggest automating one or more steps of this process to a user of the user device 240, and the user may select to implement the automated step(s). Accordingly, the contact creation and validation method may employ discovered automated steps to create and validate contacts (e.g., steps not previously automated or identified as a pattern of actions by any users of the system).

Figure 3:
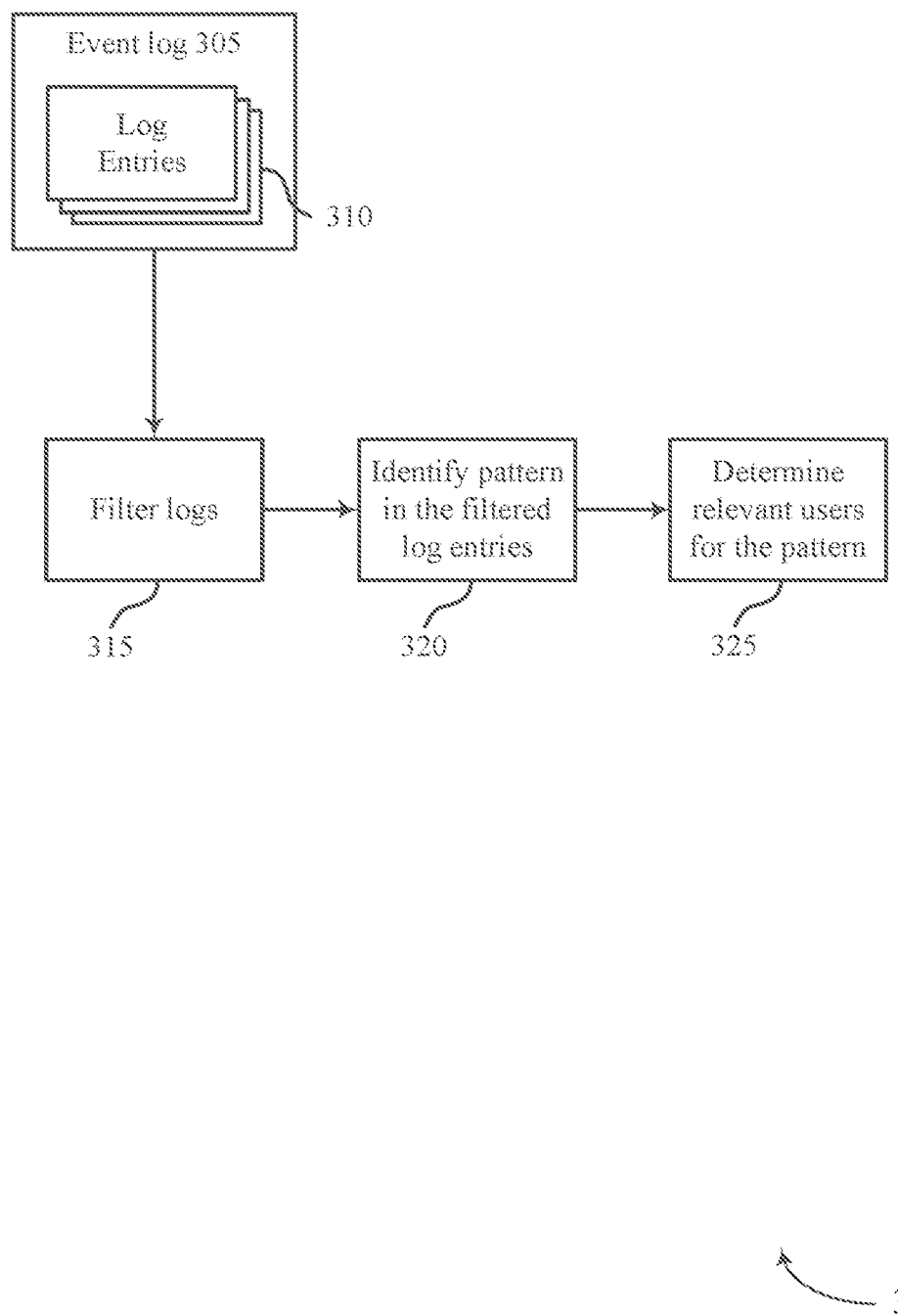
FIG. 3 illustrates an example of a discovery procedure that supports automatic determination of alternative paths for a process flow using machine learning in accordance with aspects of the present disclosure.

FIG. 3 illustrates an example of a discovery procedure 300 that supports automatic determination of alternative paths for a process flow using machine learning in accordance with aspects of the present disclosure. The discovery procedure 300 may implement or be implemented by aspects of the data processing system 100 or the computing architecture 200. For example, the discovery procedure 300 may be implemented by a database system supporting process mining procedures to automatically determine alternative paths for a process flow. The discovery procedure 300 may be one example of discovering meaningful flows from a set of log entries using process mining techniques. However, the discovery procedure 300 may involve alternative operations, additional operations, a different order of operations, or any combination thereof based on any techniques described herein.

A database system—for example, a multi-tenant database system—may store an event log 305 that tracks actions performed by multiple users (e.g., users associated with a tenant of the multi-tenant database system). The event log 305 may include log entries 310, which may be stored for individual actions performed within the database system (e.g., on different data objects). In some examples, the actions may include main actions, detailed actions, or any other type of action. In some examples, the log entries 310 may include multiple fields that describe the action for which a log entry 310 was created. For example, a log entry 310 may include fields indicating a data object on which the action was performed, a user who performed the action, a timestamp indicating a time at which the action was performed, a description of the action, or some combination of these or other fields.

At 315, the database system (e.g., including a process mining system) may filter the log entries 310 based on one or more filter parameters. For example, the log entries 310 corresponding to detailed actions (e.g., automated actions or other relatively minor actions) may be filtered out from log entries 310 corresponding to main actions. Additionally or alternatively, the database system may filter the log entries 310 based on a set of users (e.g., power users), how often actions are performed on different data object types (e.g., frequent objects), a time window of interest, or some combination thereof. In filtering the log entries 310, the database system may identify some actions that may be frequently repeated, while filtering out actions that may cause noise or variance in data retrieved from the event log 305.

At 320, the database system may identify a pattern of log entries based on the filtering. In some examples, the pattern of log entries may correspond to main actions and satisfy a frequency threshold. For example, the database system may identify the pattern of log entries based on filtering out log entries 310 corresponding to detailed actions from log entries 310 corresponding to main actions at 315. The pattern of log entries may be based on a number of sequenced main actions. For example, a set of main actions may occur in the event log 305 in a same order multiple times (e.g., a number of times satisfying a frequency threshold for pattern detection or satisfying a frequency threshold as compared to other patterns, for example, a pattern that occurs more often than 95% of other patterns or a top 5 most-common pattern).

At 325, the database system may determine one or more users of the database system that are associated with the pattern of log entries. In some cases, these users may include power users (e.g., users that are involved in relatively more actions within the event log 305 than other users). As such, the database system may identify users that may benefit from updating a portion of a process flow based on the identified pattern of log entries. Additionally or alternatively, the database system may determine a suggested portion of a process flow (e.g., a variant, an action, a path of actions) for the determined users.

Figure 4:
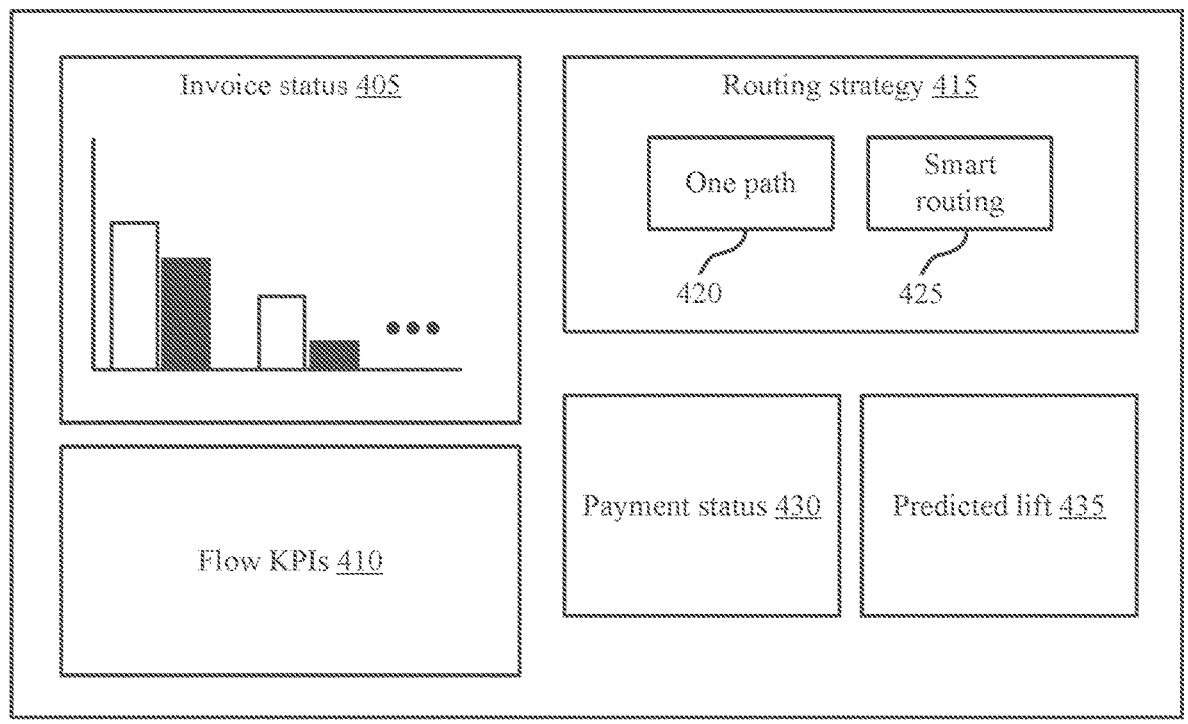
FIG. 4 illustrates an example of a user interface that supports automatic determination of alternative paths for a process flow using machine learning in accordance with aspects of the present disclosure.

FIG. 4 illustrates an example of a user interface 400 that supports automatic determination of alternative paths for a process flow using machine learning in accordance with aspects of the present disclosure. The user interface 400 may implement or be implemented by aspects of the data processing system 100 or the computing architecture 200. For example, the user interface 400 may be implemented by a user device accessing a database system, where the database system supports a process mining system to automatically determine alternative paths for a process flow. The user interface 400 may be an example of a dashboard used during process mining. The user interface 400 may be a component of a user device, and the user interface 400 may receive data for display from the user device or over a network (e.g., from a cloud-based platform or other application). The user device may communicate using the network, for example, by sending user inputs received at the user interface 400 to a system over the network.

In the example of FIG. 4, a user may use the user interface 400 to identify gain information associated with adding additional portions, variants, actions, paths of actions, or a combination thereof to a process flow. For example, the user may use the user interface 400 to determine an optimal process—or an otherwise improved process—for processing an invoice. The user interface 400 may include an invoice status 405, which may indicate the current status of an invoice. For example, the invoice status 405 may indicate whether an invoice is paid on time, late, or if the status of the invoice is unknown or outstanding. In addition, the user interface 400 may indicate flow KPIs 410. For example, a user of the database system may define the flow KPIs 410 as a metric on which to measure the efficiency or performance of a process flow. The flow KPIs may include a time to perform a process flow, an accuracy metric, or other metrics the process mining system may use to select at least a portion of a process flow or a variant of the process flow for implementation. That is, the KPIs may be user-defined or system-defined metrics for measuring which processes or process flows to use.

Additionally or alternatively, the user interface 400 may indicate a routing strategy 415, which may indicate different process flow options a user may select. The routing strategy 415 may indicate an option to use one path 420 or to use smart routing 425. In some examples, if the one path 420 is selected, all users may be routed down a single, optimized path for the specific process (e.g., a single process for handling invoices). If the smart routing 425 is selected, users may be routed down different paths based on one or more parameters (e.g., specific invoices may be handled different in the process flow based on aspects of the invoices). In some examples, the smart routing 425 may increase the flow KPIs 410 by a higher percentage than the one path 420.

In some cases, the user interface 400 may include a payment status 430, which may indicate how many invoices may be paid on time or late given the current process flow. If more invoices are being paid late than on time, a user may consider using the process mining techniques described herein to improve the process flow in order to increase the number of invoices being paid on time. Additionally or alternatively, the user interface 400 may include a predicted lift 435, which may indicate a prediction for how the payment status 430 may change over a period of time (e.g., based on a model) if a specific process flow, path in a process flow, or operation in a process flow is implemented. As such, the user interface 400 may provide real-time indications of the efficiency and effectiveness of a process flow such that a user may make changes (e.g., add a new process flow, add new variants, actions, or paths) to the process flow to further improve the efficiency and effectiveness of processes in the database system. A user operating the user device including the user interface 400 may use the user interface 400 to analyze results of process mining and select changes to process flows using user inputs.

Figure 5:
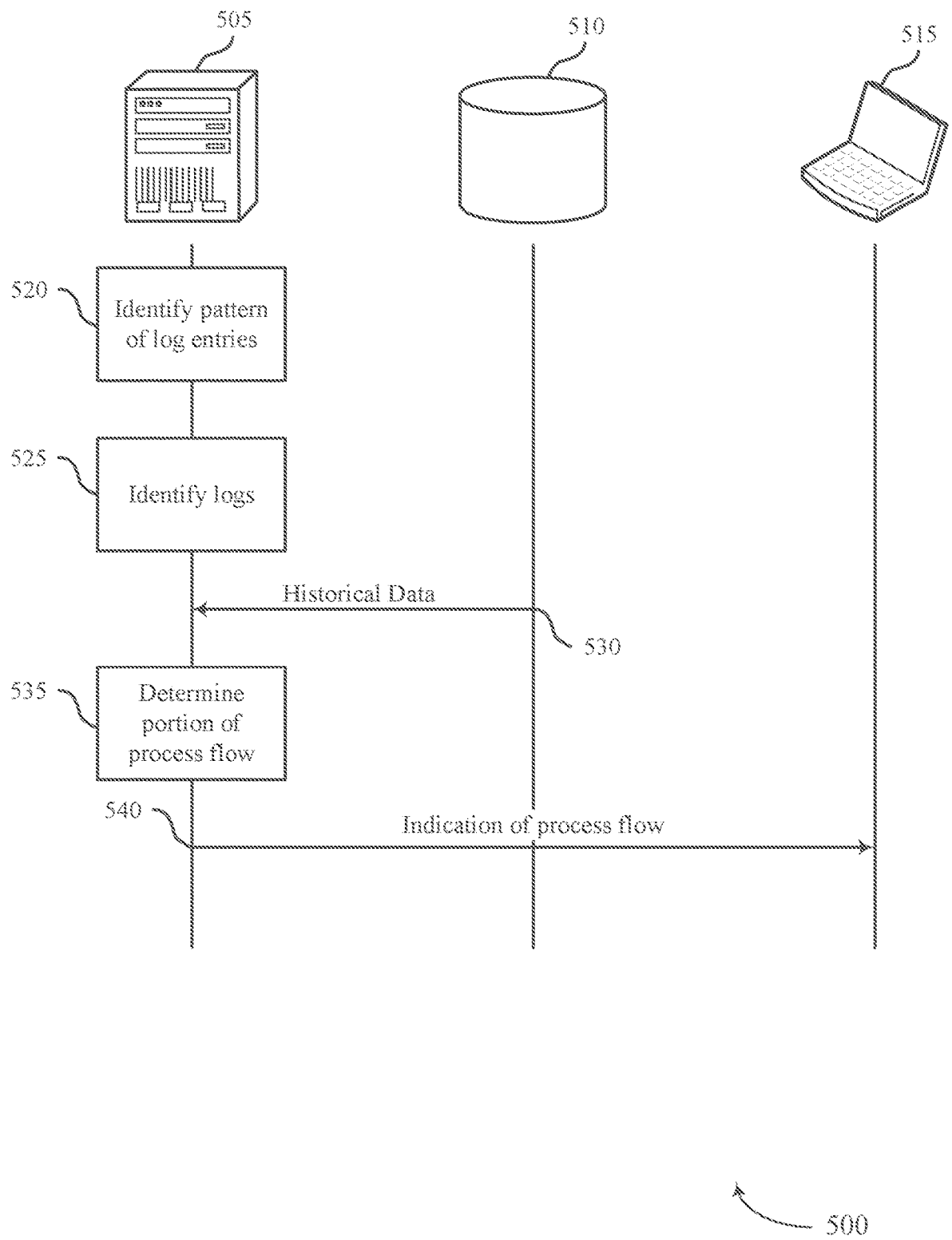
FIG. 5 illustrates an example of a process flow that supports automatic determination of alternative paths for a process flow using machine learning in accordance with aspects of the present disclosure.

FIG. 5 illustrates an example of a process flow 500 that supports automatic determination of alternative paths for a process flow using machine learning in accordance with aspects of the present disclosure. The process flow 500 may implement or be implemented by aspects of the data processing system 100 and the computing architecture 200. For example, the process flow 500 may include a process mining system 505, a multi-tenant database system 510, and a user device 515, which may be examples of corresponding services and platforms described with reference to FIGS. 1 and 2. In some examples, the process mining system 505 may be an example of a component of the multi-tenant database system 510. In the following description of the process flow 500, operations between the process mining system 505, the multi-tenant database system 510, and the user device 515 may be performed in a different order or at a different time than as shown. Additionally or alternatively, some operations may be omitted from the process flow 500, and other operations may be added to the process flow 500.

At 520, the process mining system 505 may identify, from an event log including a set of log entries for a tenant of the multi-tenant database system 510, a pattern of log entries corresponding to main actions and satisfying a frequency threshold in the event log. For example, the pattern may satisfy the frequency threshold by occurring more than a threshold quantity of times in the event log, or the pattern may satisfy the frequency threshold by occurring more often than a threshold amount of other patterns in the event log (e.g., the pattern is a top K most frequent pattern identified in the event log or in the top K percentage of frequent patterns identified in the event log). The event log may track actions performed by multiple users in the multi-tenant database system 510. In some examples, the pattern of log entries may correspond to an ordered sequence of main actions.

At 525, the process mining system 505 may identify, from the event log, one or more log entries associated with the pattern of log entries, the one or more log entries including log entries corresponding to the main actions, log entries corresponding to the detailed actions, or a combination thereof. For example, the one or more log entries may include a log entry corresponding to a main action and one or more log entries corresponding to detailed actions related to the main action.

At 530, the process mining system 505 may access data from the multi-tenant database system 510 corresponding to a history field of a data object associated with the pattern of log entries. The history field may include data associated with actions performed on the data object, where the history field and the event log may be linked through a particular field (e.g., an identifier associated with the data object). As such, the historical data may indicate log entries associated with the data object that is itself associated with the pattern of log entries (e.g., affected by actions within the pattern of log entries).

At 535, the process mining system 505 may determine at least a portion of a process flow for the data object according to the pattern of log entries and based on the one or more log entries and the data corresponding to the history field. The process flow may include one or more operations (e.g., actions, events) to perform, which may include at least one operation to perform using the data object. For example, the process flow may be an automated or guided process that an organization may implement to perform a task based on a data input. In some examples, the determined portion of the process flow may be optimized based on the pattern mining and the specific data structure of the multi-tenant database system 510, which supports the event log and the history field.

At 540, the process mining system 505 may transmit an indication of at least the portion of the process flow to the user device 515. Additionally, the process mining system 505 may provide relevant data highlighting one or more gains associated with adding or modifying the process flow to include the portion of the process flow. In some examples, a user operating the user device 515 may select the portion of the process flow for implementation in the multi-tenant database system 510. In response to this user input, the process mining system 505 may update the process flow in the multi-tenant database system 510 based on the selection of the portion of the process flow.

Figure 6:
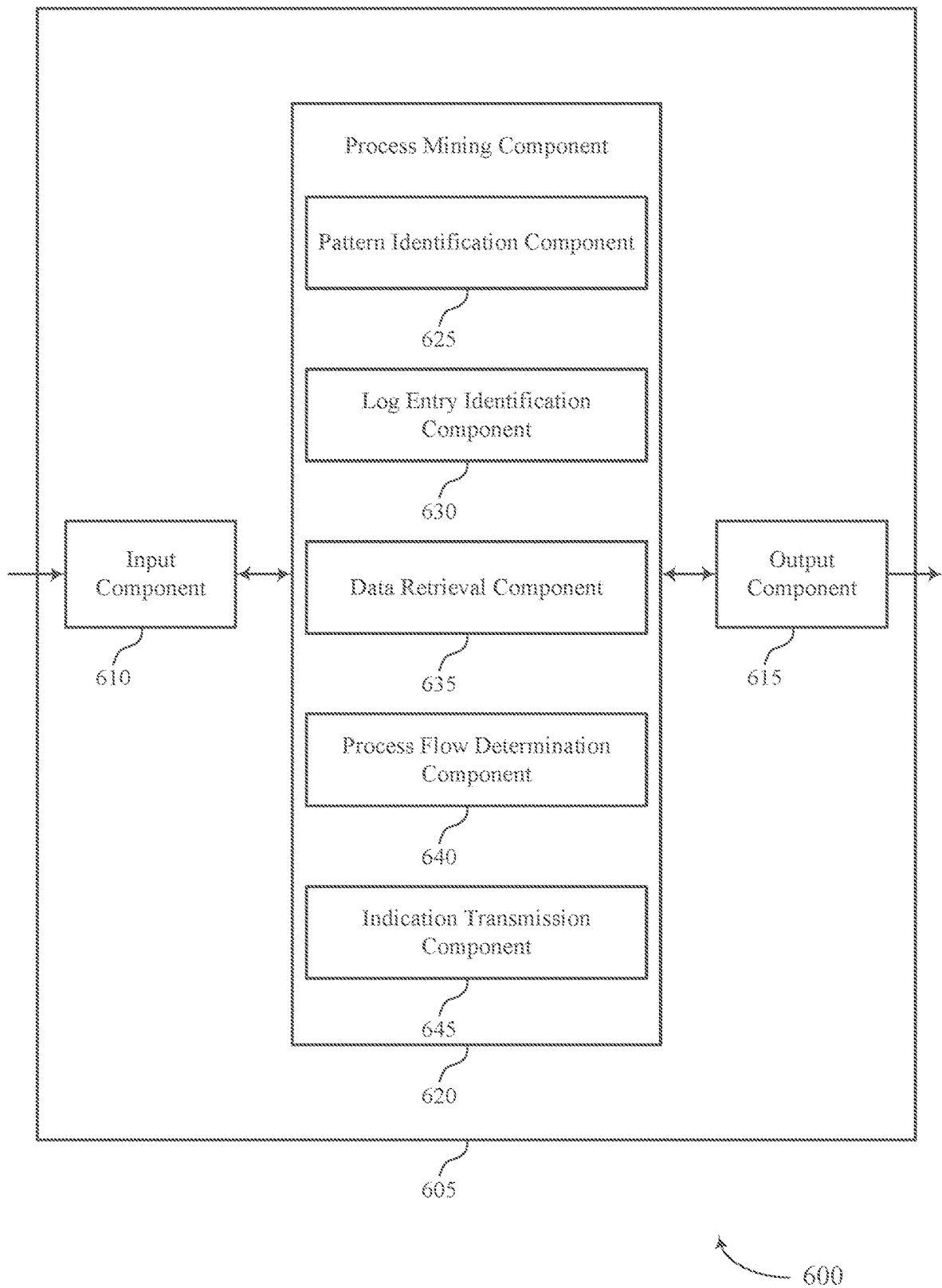
FIG. 6 shows a block diagram of an apparatus that supports automatic determination of alternative paths for a process flow using machine learning in accordance with aspects of the present disclosure.

FIG. 6 shows a block diagram 600 of a device 605 that supports automatic determination of alternative paths for a process flow using machine learning in accordance with aspects of the present disclosure. The device 605 may include an input component 610, an output component 615, and a process mining component 620. The device 605 may also include a processor. Each of these components may be in communication with one another (e.g., via one or more buses).

The input component 610 may manage input signals for the device 605. For example, the input component 610 may identify input signals based on an interaction with a modem, a keyboard, a mouse, a touchscreen, or a similar device. These input signals may be associated with user input or processing at other components or devices. In some cases, the input component 610 may utilize an operating system such as iOS®, ANDROID®, MS-DOS®, MS-WINDOWS®, OS/2®, UNIX®, LINUX®, or another known operating system to handle input signals. The input component 610 may send aspects of these input signals to other components of the device 605 for processing. For example, the input component 610 may transmit input signals to the process mining component 620 to support automatic determination of alternative paths for a process flow using machine learning. In some cases, the input component 610 may be a component of an input/output (I/O) controller 810 as described with reference to FIG. 8.

The output component 615 may manage output signals for the device 605. For example, the output component 615 may receive signals from other components of the device 605, such as the process mining component 620, and may transmit these signals to other components or devices. In some examples, the output component 615 may transmit output signals for display in a user interface, for storage in a database or data store, for further processing at a server or server cluster, or for any other processes at any number of devices or systems. In some cases, the output component 615 may be a component of an I/O controller 810 as described with reference to FIG. 8.

For example, the process mining component 620 may include a pattern identification component 625, a log entry identification component 630, a data retrieval component 635, a process flow determination component 640, an indication transmission component 645, or any combination thereof. In some examples, the process mining component 620, or various components thereof, may be configured to perform various operations (e.g., receiving, monitoring, transmitting) using or otherwise in cooperation with the input component 610, the output component 615, or both. For example, the process mining component 620 may receive information from the input component 610, send information to the output component 615, or be integrated in combination with the input component 610, the output component 615, or both to receive information, transmit information, or perform various other operations as described herein.

The process mining component 620 may support automatic process mining in accordance with examples as disclosed herein. The pattern identification component 625 may be configured as or otherwise support a means for identifying, from an event log comprising a plurality of log entries for a tenant of a multi-tenant database system, a pattern of log entries corresponding to main actions and satisfying a frequency threshold in the event log. The log entry identification component 630 may be configured as or otherwise support a means for identifying, from the event log, one or more log entries associated with the pattern of log entries, the one or more log entries comprising log entries corresponding to the main actions, log entries corresponding to detailed actions, or a combination thereof. The data retrieval component 635 may be configured as or otherwise support a means for retrieving data from the multi-tenant database system corresponding to a history field of a data object associated with the pattern of log entries. The process flow determination component 640 may be configured as or otherwise support a means for determining at least a portion of a process flow for the data object according to the pattern of log entries and based at least in part on the one or more log entries and the data corresponding to the history field, the process flow comprising one or more operations to perform using the data object. The indication transmission component 645 may be configured as or otherwise support a means for transmitting, to a user device, an indication of at least the portion of the process flow.

Figure 7:
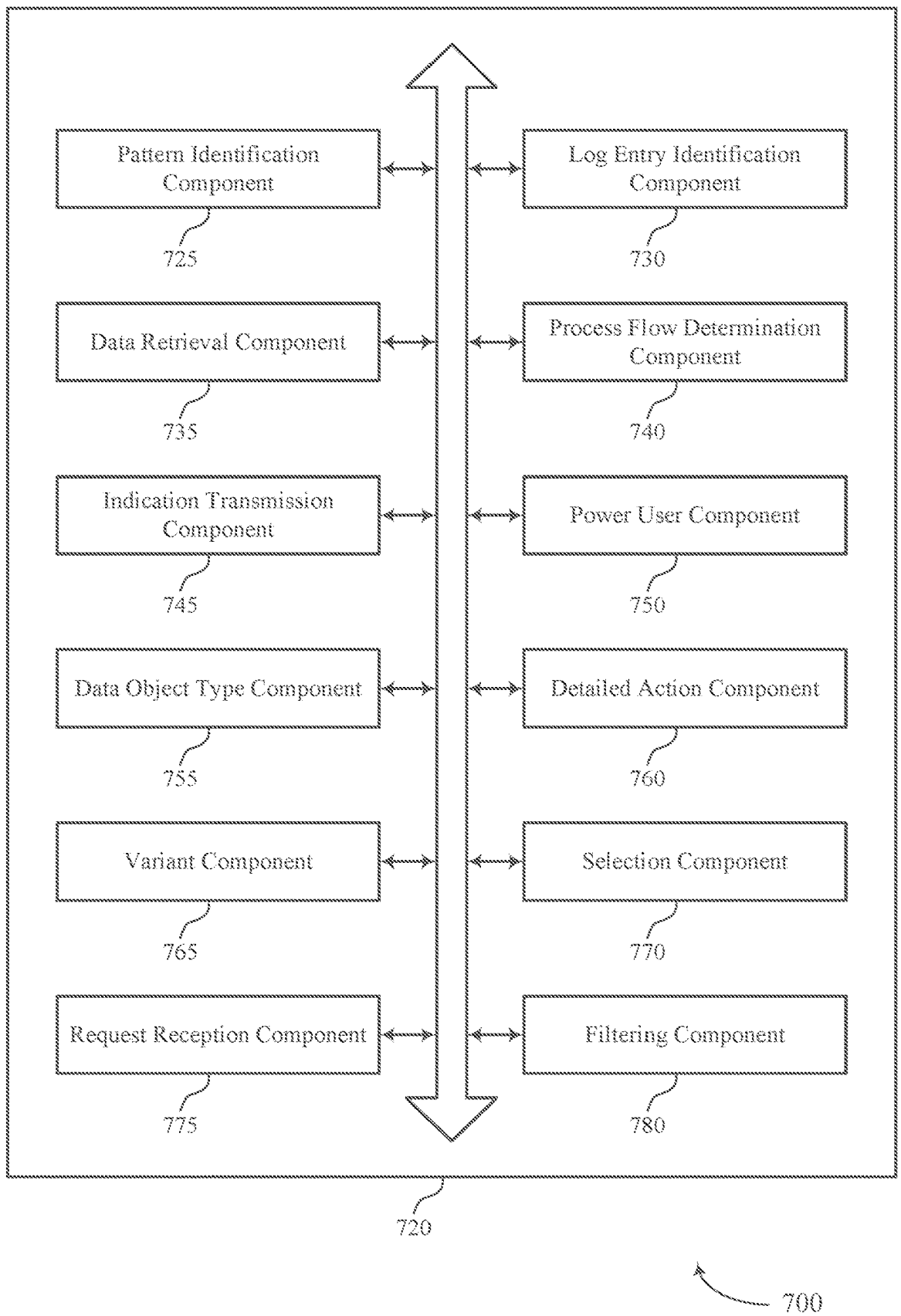
FIG. 7 shows a block diagram of a process mining component that supports automatic determination of alternative paths for a process flow using machine learning in accordance with aspects of the present disclosure.

FIG. 7 shows a block diagram 700 of a process mining component 720 that supports automatic determination of alternative paths for a process flow using machine learning in accordance with aspects of the present disclosure. The process mining component 720 may be an example of aspects of a component of a database system (e.g., a process mining system) or a process mining component 620, or both, as described herein. The process mining component 720, or various components thereof, may be an example of means for performing various aspects of automatic determination of alternative paths for a process flow using machine learning as described herein. For example, the process mining component 720 may include a pattern identification component 725, a log entry identification component 730, a data retrieval component 735, a process flow determination component 740, an indication transmission component 745, a power user component 750, a data object type component 755, a detailed action component 760, a variant component 765, a selection component 770, a request reception component 775, a filtering component 780, or any combination thereof. Each of these components may communicate, directly or indirectly, with one another (e.g., via one or more buses).

The process mining component 720 may support automatic process mining in accordance with examples as disclosed herein. The pattern identification component 725 may be configured as or otherwise support a means for identifying, from an event log comprising a plurality of log entries for a tenant of a multi-tenant database system, a pattern of log entries corresponding to main actions and satisfying a frequency threshold in the event log. The log entry identification component 730 may be configured as or otherwise support a means for identifying, from the event log, one or more log entries associated with the pattern of log entries, the one or more log entries comprising log entries corresponding to the main actions, log entries corresponding to detailed actions, or a combination thereof. The data retrieval component 735 may be configured as or otherwise support a means for retrieving data from the multi-tenant database system corresponding to a history field of a data object associated with the pattern of log entries. The process flow determination component 740 may be configured as or otherwise support a means for determining at least a portion of a process flow for the data object according to the pattern of log entries and based at least in part on the one or more log entries and the data corresponding to the history field, the process flow comprising one or more operations to perform using the data object. The indication transmission component 745 may be configured as or otherwise support a means for transmitting, to a user device, an indication of at least the portion of the process flow.

In some examples, the power user component 750 may be configured as or otherwise support a means for identifying one or more users associated with a threshold quantity or percentage of users most frequently performing events in the multi-tenant database system according to the event log, wherein the pattern of log entries is identified from log entries associated with the identified one or more users.

In some examples, the data object type component 755 may be configured as or otherwise support a means for identifying one or more data object types associated with at least a threshold quantity or percentage of data object types most frequently corresponding to events of the log entries, wherein the pattern of log entries is identified from log entries associated with the one or more data object types, and wherein the one or more data object types comprises the data object associated with the pattern of log entries.

In some examples, the detailed action component 760 may be configured as or otherwise support a means for identifying the log entries corresponding to the detailed actions for the one or more log entries based at least in part on a time window corresponding to the pattern of log entries and one or more users, one or more data object types, or both associated with the log entries corresponding to the detailed actions and the log entries corresponding to the main actions.

In some examples, the time window starts a first threshold time before a first log entry of the pattern of log entries and ends a second threshold time after a second log entry of the pattern of log entries. In some examples, the frequency threshold in the event log comprises a quantity of occurrences of a pattern within a time period.

In some examples, the variant component 765 may be configured as or otherwise support a means for determining a plurality of variants corresponding to the pattern of log entries, the plurality of variants comprising one or more shared actions, one or more shared data object types, one or more shared users, or a combination thereof. In some examples, the variant component 765 may be configured as or otherwise support a means for selecting a variant of the plurality of variants based at least in part on a selection parameter, the selection parameter comprising a time to perform the variant, an accuracy metric associated with the variant, or both, wherein determining at least the portion of the process flow is based at least in part on the selected variant.

In some examples, the variant component 765 may be configured as or otherwise support a means for transmitting, to the user device, additional data associated with the plurality of variants, the additional data indicating respective gain information for one or more variants of the plurality of variants based at least in part on the selection parameter.

In some examples, the selection component 770 may be configured as or otherwise support a means for receiving, from the user device and in response to the indication of at least the portion of the process flow, a selection of the portion of the process flow. In some examples, the selection component 770 may be configured as or otherwise support a means for updating the process flow at the multi-tenant database system based at least in part on the selection of the portion of the process flow.

In some examples, the selection component 770 may be configured as or otherwise support a means for detecting a first action corresponding to an initial step of the process flow. In some examples, the selection component 770 may be configured as or otherwise support a means for performing one or more additional actions corresponding to steps of the process flow in response to detecting the first action, wherein the one or more additional actions comprises at least the portion of the process flow.

In some examples, the request reception component 775 may be configured as or otherwise support a means for receiving, from the user device, a request to analyze the data object, the process flow, or a combination thereof, wherein identifying the pattern of log entries is based at least in part on the request.

In some examples, the filtering component 780 may be configured as or otherwise support a means for filtering out a subset of log entries of the event log based at least in part on one or more filter parameters, wherein the pattern of log entries is identified based at least in part on the filtering.

In some examples, the process flow determination component 740 may be configured as or otherwise support a means for adding an additional action to the process flow based at least in part on determining at least the portion of the process flow.

In some examples, the process flow determination component 740 may be configured as or otherwise support a means for adding an additional path of actions to the process flow based at least in part on determining at least the portion of the process flow.

In some examples, the process flow determination component 740 may be configured as or otherwise support a means for adding the process flow to the multi-tenant database system based at least in part on determining at least the portion of the process flow.

In some examples, the pattern of log entries is identified and at least the portion of the process flow is determined internal to the multi-tenant database system, and wherein the event log and the history field of the data object are accessed according to a security policy of the multi-tenant database system.

In some examples, a log entry of the event log comprises a first plurality of fields indicating a data object type, a specific data object of the data object type, a first timestamp, a first user identifier, a client session identifier, a classification, or a combination thereof. In some examples, the history field of the data object comprises a second plurality of fields indicating a field of the data object, a second timestamp, a second user identifier, an original value for the field, a current value for the field, or a combination thereof. In some examples, the event log tracks actions performed by a plurality of users associated with the tenant. In some examples, the history field of the data object tracks actions performed on the data object, using the data object, or both.

In some examples, the pattern identification component 725 may be configured as or otherwise support a means for automatically updating the event log, the history field of the data object, or both based at least in part on a user performing an action in the multi-tenant database system.

Figure 8:
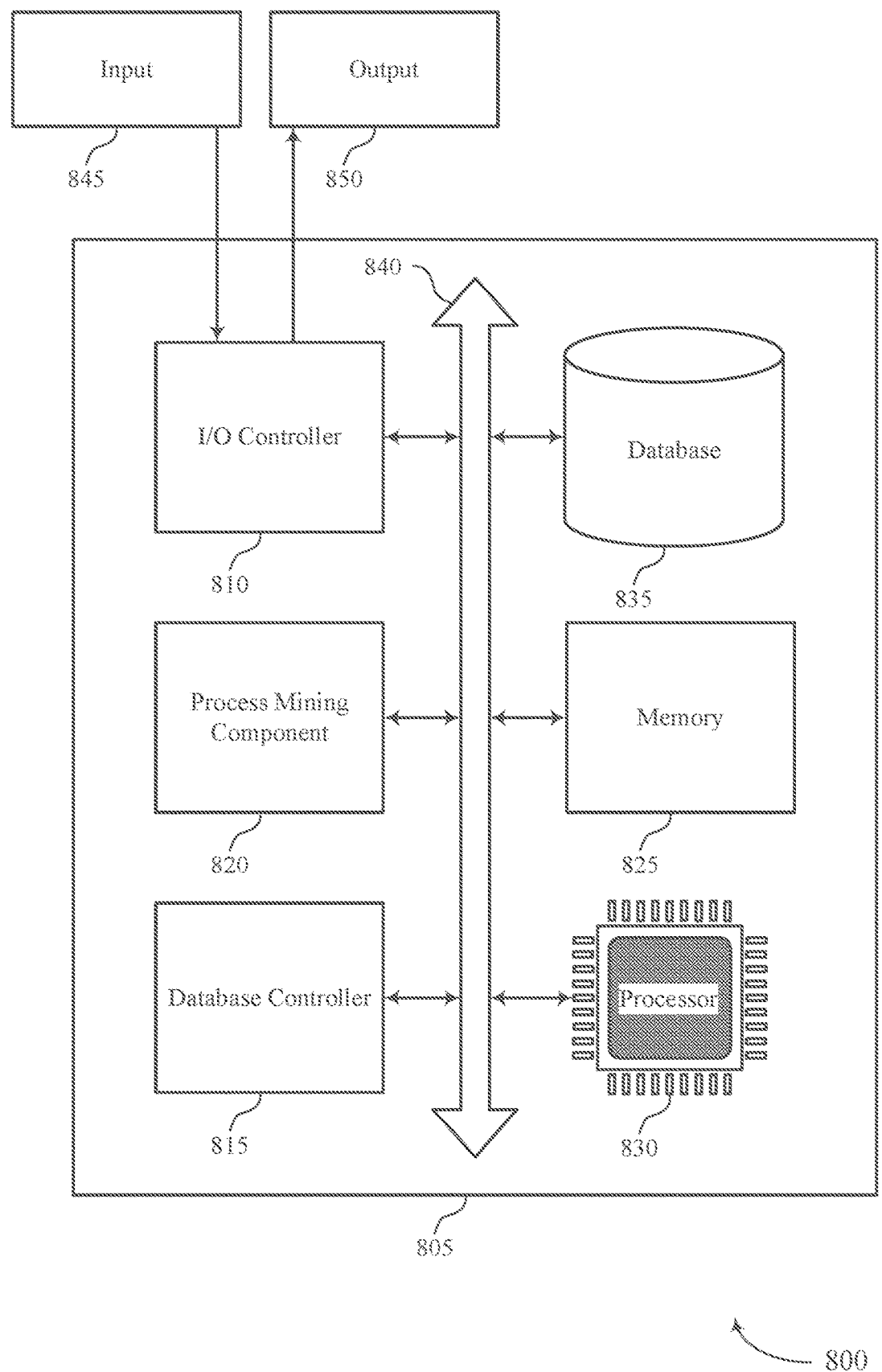
FIG. 8 shows a diagram of a system including a device that supports automatic determination of alternative paths for a process flow using machine learning in accordance with aspects of the present disclosure.

FIG. 8 shows a diagram of a system 800 including a device 805 that supports automatic determination of alternative paths for a process flow using machine learning in accordance with aspects of the present disclosure. The device 805 may be an example of or include the components of a device 605 as described herein. The device 805 may include components for bi-directional data communications including components for transmitting and receiving communications, such as a process mining component 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor 830 to perform various functions described herein. In some cases, the memory 825 may contain, among other things, a basic I/O system (BIOS) which may control basic hardware or software operation such as the interaction with peripheral components or devices.

The processor 830 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting automatic determination of alternative paths for a process flow using machine learning).

The process mining component 820 may support automatic process mining in accordance with examples as disclosed herein. For example, the process mining component 820 may be configured as or otherwise support a means for identifying, from an event log comprising a plurality of log entries for a tenant of a multi-tenant database system, a pattern of log entries corresponding to main actions and satisfying a frequency threshold in the event log. The process mining component 820 may be configured as or otherwise support a means for identifying, from the event log, one or more log entries associated with the pattern of log entries, the one or more log entries comprising log entries corresponding to the main actions, log entries corresponding to detailed actions, or a combination thereof. The process mining component 820 may be configured as or otherwise support a means for retrieving data from the multi-tenant database system corresponding to a history field of a data object associated with the pattern of log entries. The process mining component 820 may be configured as or otherwise support a means for determining at least a portion of a process flow for the data object according to the pattern of log entries and based at least in part on the one or more log entries and the data corresponding to the history field, the process flow comprising one or more operations to perform using the data object. The process mining component 820 may be configured as or otherwise support a means for transmitting, to a user device, an indication of at least the portion of the process flow.

By including or configuring the process mining component 820 in accordance with examples as described herein, the device 805 may support techniques for automatic determination of alternative paths for a process flow using machine learning, which may leverage a particular data structure supported by a multi-tenant database system to identify alternative paths for process flows. As such, the described techniques may improve workflow efficiencies and increase process flow performance.

Figure 9:
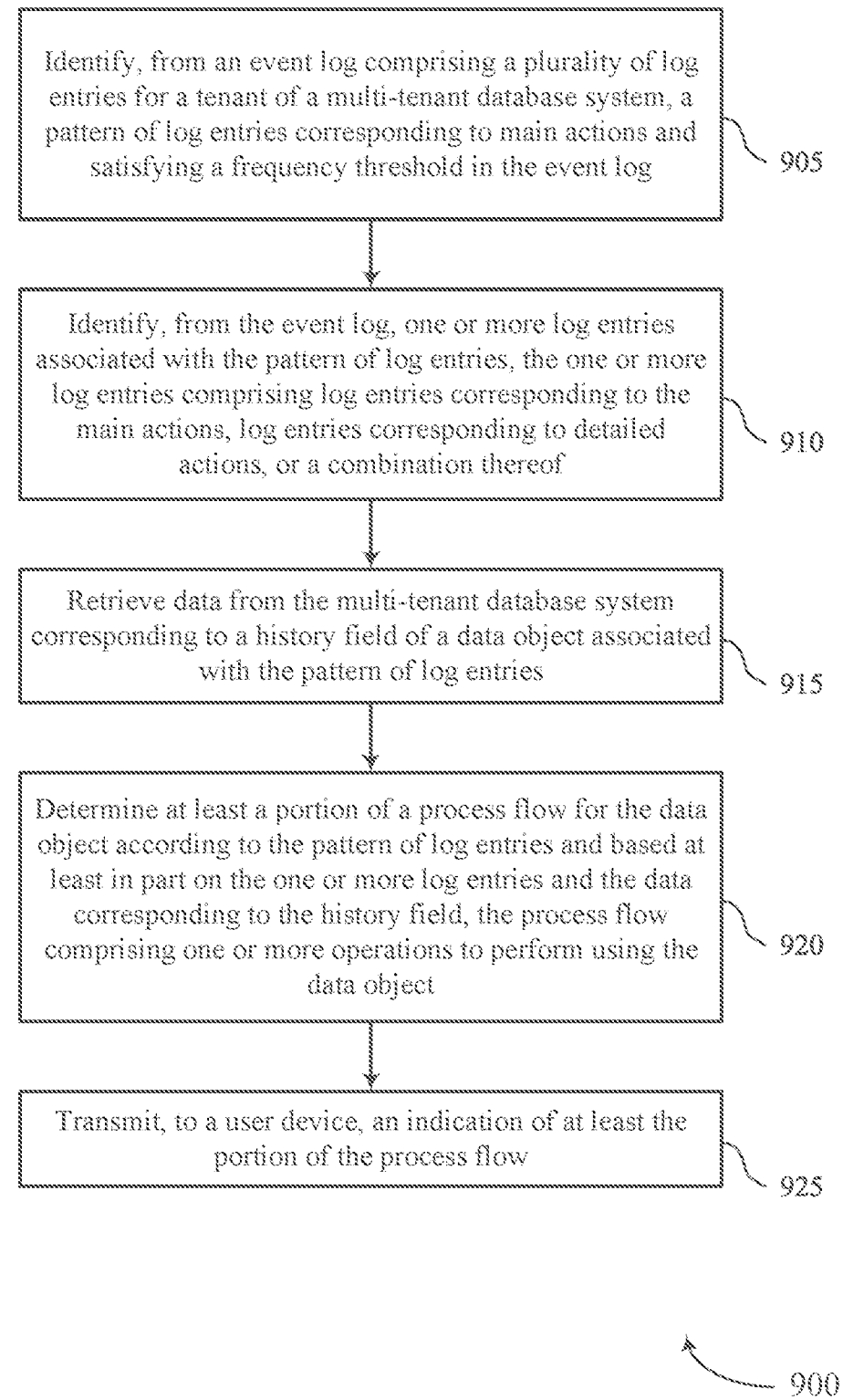
FIGS. 9 through 12 show flowcharts illustrating methods that support automatic determination of alternative paths for a process flow using machine learning in accordance with aspects of the present disclosure.

FIG. 9 shows a flowchart illustrating a method 900 that supports automatic determination of alternative paths for a process flow using machine learning in accordance with aspects of the present disclosure. The operations of the method 900 may be implemented by a system (e.g., using an application server, a cloud-based server, a database server, a worker, a server cluster, a virtual machine, a container, or any other device or system configured for data processing) or its components as described herein. For example, the operations of the method 900 may be performed by a system as described with reference to FIGS. 1 through 8. In some examples, a system may execute a set of instructions to control the functional elements of the system to perform the described functions. Additionally or alternatively, the system may perform aspects of the described functions using special-purpose hardware.

At 905, the method may include identifying, from an event log comprising a plurality of log entries for a tenant of a multi-tenant database system, a pattern of log entries corresponding to main actions and satisfying a frequency threshold in the event log. The operations of 905 may be performed in accordance with examples as disclosed herein. In some examples, aspects of the operations of 905 may be performed by a pattern identification component 725 as described with reference to FIG. 7.

At 910, the method may include identifying, from the event log, one or more log entries associated with the pattern of log entries, the one or more log entries comprising log entries corresponding to the main actions, log entries corresponding to detailed actions, or a combination thereof. The operations of 910 may be performed in accordance with examples as disclosed herein. In some examples, aspects of the operations of 910 may be performed by a log entry identification component 730 as described with reference to FIG. 7.

At 915, the method may include retrieving data from the multi-tenant database system corresponding to a history field of a data object associated with the pattern of log entries. The operations of 915 may be performed in accordance with examples as disclosed herein. In some examples, aspects of the operations of 915 may be performed by a data retrieval component 735 as described with reference to FIG. 7.

At 920, the method may include determining at least a portion of a process flow for the data object according to the pattern of log entries and based at least in part on the one or more log entries and the data corresponding to the history field, the process flow comprising one or more operations to perform using the data object. The operations of 920 may be performed in accordance with examples as disclosed herein. In some examples, aspects of the operations of 920 may be performed by a process flow determination component 740 as described with reference to FIG. 7.

At 925, the method may include transmitting, to a user device, an indication of at least the portion of the process flow. The operations of 925 may be performed in accordance with examples as disclosed herein. In some examples, aspects of the operations of 925 may be performed by an indication transmission component 745 as described with reference to FIG. 7.

Figure 10:
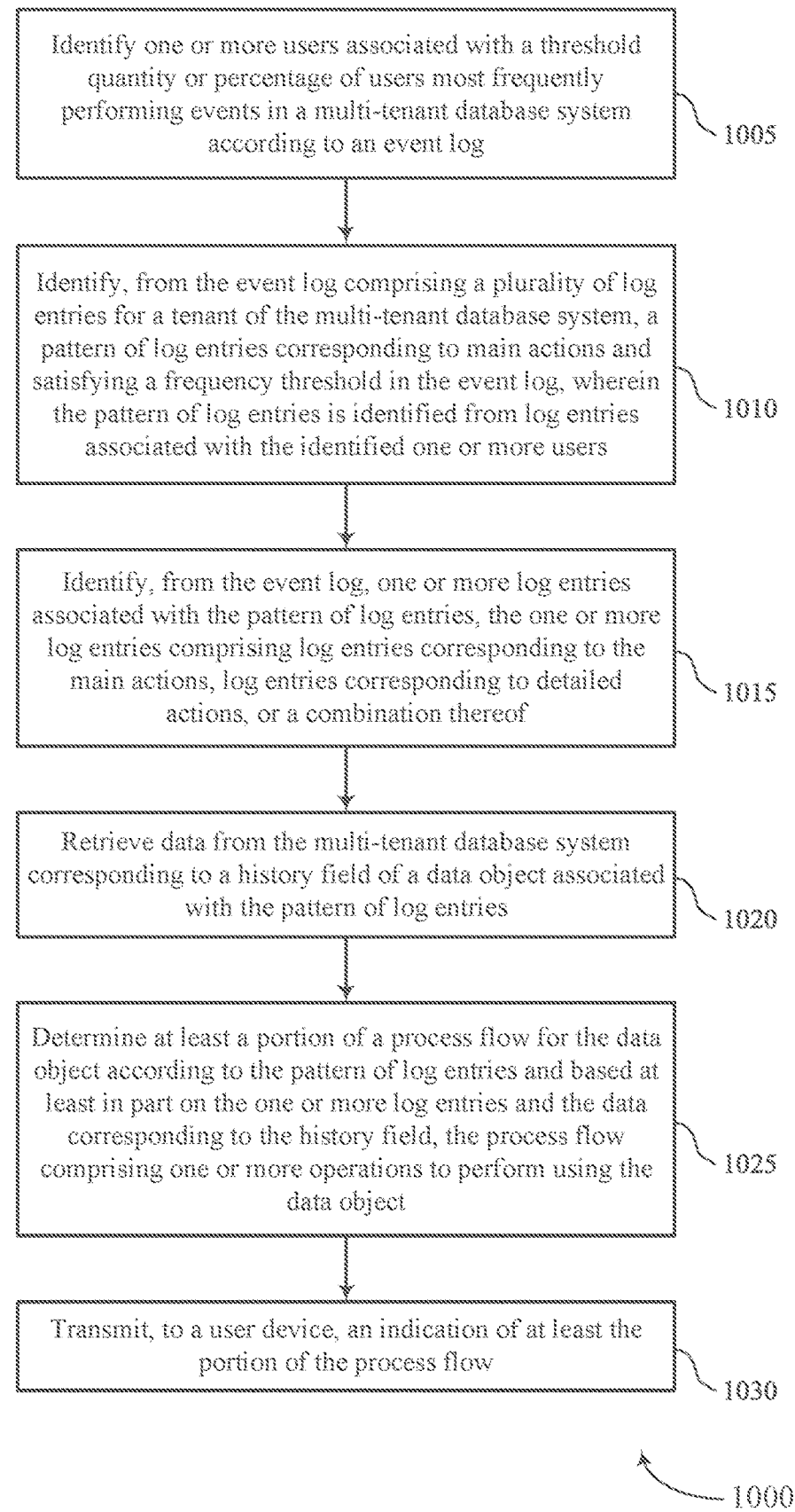

FIG. 10 shows a flowchart illustrating a method 1000 that supports automatic determination of alternative paths for a process flow using machine learning in accordance with aspects of the present disclosure. The operations of the method 1000 may be implemented by a system or its components as described herein. For example, the operations of the method 1000 may be performed by a system as described with reference to FIGS. 1 through 8. In some examples, a system may execute a set of instructions to control the functional elements of the system to perform the described functions. Additionally or alternatively, the system may perform aspects of the described functions using special-purpose hardware.

At 1005, the method may include identifying one or more users associated a threshold quantity or percentage of users most frequently performing events in a multi-tenant database system according to an event log. The operations of 1005 may be performed in accordance with examples as disclosed herein. In some examples, aspects of the operations of 1005 may be performed by a power user component 750 as described with reference to FIG. 7.

At 1010, the method may include identifying, from the event log comprising a plurality of log entries for a tenant of the multi-tenant database system, a pattern of log entries corresponding to main actions and satisfying a frequency threshold in the event log, wherein the pattern of log entries is identified from log entries associated with the identified one or more users. The operations of 1010 may be performed in accordance with examples as disclosed herein. In some examples, aspects of the operations of 1010 may be performed by a pattern identification component 725 as described with reference to FIG. 7.

At 1015, the method may include identifying, from the event log, one or more log entries associated with the pattern of log entries, the one or more log entries comprising log entries corresponding to the main actions, log entries corresponding to detailed actions, or a combination thereof. The operations of 1015 may be performed in accordance with examples as disclosed herein. In some examples, aspects of the operations of 1015 may be performed by a log entry identification component 730 as described with reference to FIG. 7.

At 1020, the method may include retrieving data from the multi-tenant database system corresponding to a history field of a data object associated with the pattern of log entries. The operations of 1020 may be performed in accordance with examples as disclosed herein. In some examples, aspects of the operations of 1020 may be performed by a data retrieval component 735 as described with reference to FIG. 7.

At 1025, the method may include determining at least a portion of a process flow for the data object according to the pattern of log entries and based at least in part on the one or more log entries and the data corresponding to the history field, the process flow comprising one or more operations to perform using the data object. The operations of 1025 may be performed in accordance with examples as disclosed herein. In some examples, aspects of the operations of 1025 may be performed by a process flow determination component 740 as described with reference to FIG. 7.

At 1030, the method may include transmitting, to a user device, an indication of at least the portion of the process flow. The operations of 1030 may be performed in accordance with examples as disclosed herein. In some examples, aspects of the operations of 1030 may be performed by an indication transmission component 745 as described with reference to FIG. 7.

Figure 11:
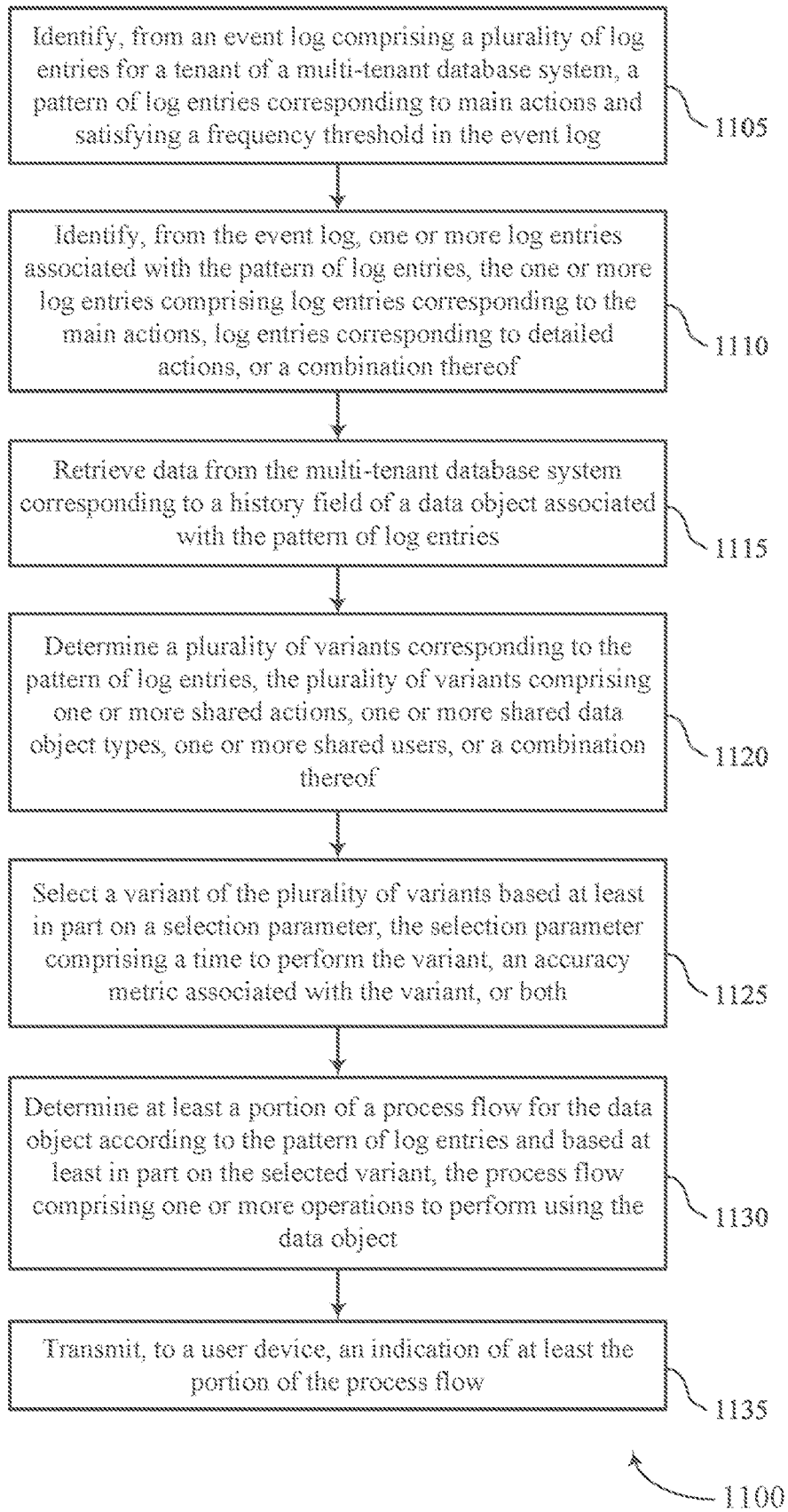

FIG. 11 shows a flowchart illustrating a method 1100 that supports automatic determination of alternative paths for a process flow using machine learning in accordance with aspects of the present disclosure. The operations of the method 1100 may be implemented by a system or its components as described herein. For example, the operations of the method 1100 may be performed by a system as described with reference to FIGS. 1 through 8. In some examples, a system may execute a set of instructions to control the functional elements of the system to perform the described functions. Additionally or alternatively, the system may perform aspects of the described functions using special-purpose hardware.

At 1105, the method may include identifying, from an event log comprising a plurality of log entries for a tenant of a multi-tenant database system, a pattern of log entries corresponding to main actions and satisfying a frequency threshold in the event log. The operations of 1105 may be performed in accordance with examples as disclosed herein. In some examples, aspects of the operations of 1105 may be performed by a pattern identification component 725 as described with reference to FIG. 7.

At 1110, the method may include identifying, from the event log, one or more log entries associated with the pattern of log entries, the one or more log entries comprising log entries corresponding to the main actions, log entries corresponding to detailed actions, or a combination thereof. The operations of 1110 may be performed in accordance with examples as disclosed herein. In some examples, aspects of the operations of 1110 may be performed by a log entry identification component 730 as described with reference to FIG. 7.

At 1115, the method may include retrieving data from the multi-tenant database system corresponding to a history field of a data object associated with the pattern of log entries. The operations of 1115 may be performed in accordance with examples as disclosed herein. In some examples, aspects of the operations of 1115 may be performed by a data retrieval component 735 as described with reference to FIG. 7.

At 1120, the method may include determining a plurality of variants corresponding to the pattern of log entries, the plurality of variants comprising one or more shared actions, one or more shared data object types, one or more shared users, or a combination thereof. The operations of 1120 may be performed in accordance with examples as disclosed herein. In some examples, aspects of the operations of 1120 may be performed by a variant component 765 as described with reference to FIG. 7.

At 1125, the method may include selecting a variant of the plurality of variants based at least in part on a selection parameter, the selection parameter comprising a time to perform the variant, an accuracy metric associated with the variant, or some combination of these or other selection metrics. The operations of 1125 may be performed in accordance with examples as disclosed herein. In some examples, aspects of the operations of 1125 may be performed by a variant component 765 as described with reference to FIG. 7.

At 1130, the method may include determining at least a portion of a process flow for the data object according to the pattern of log entries and based at least in part on the selected variant, the process flow comprising one or more operations to perform using the data object. The operations of 1130 may be performed in accordance with examples as disclosed herein. In some examples, aspects of the operations of 1130 may be performed by a process flow determination component 740 as described with reference to FIG. 7.

At 1135, the method may include transmitting, to a user device, an indication of at least the portion of the process flow. The operations of 1135 may be performed in accordance with examples as disclosed herein. In some examples, aspects of the operations of 1135 may be performed by an indication transmission component 745 as described with reference to FIG. 7.

Figure 12:
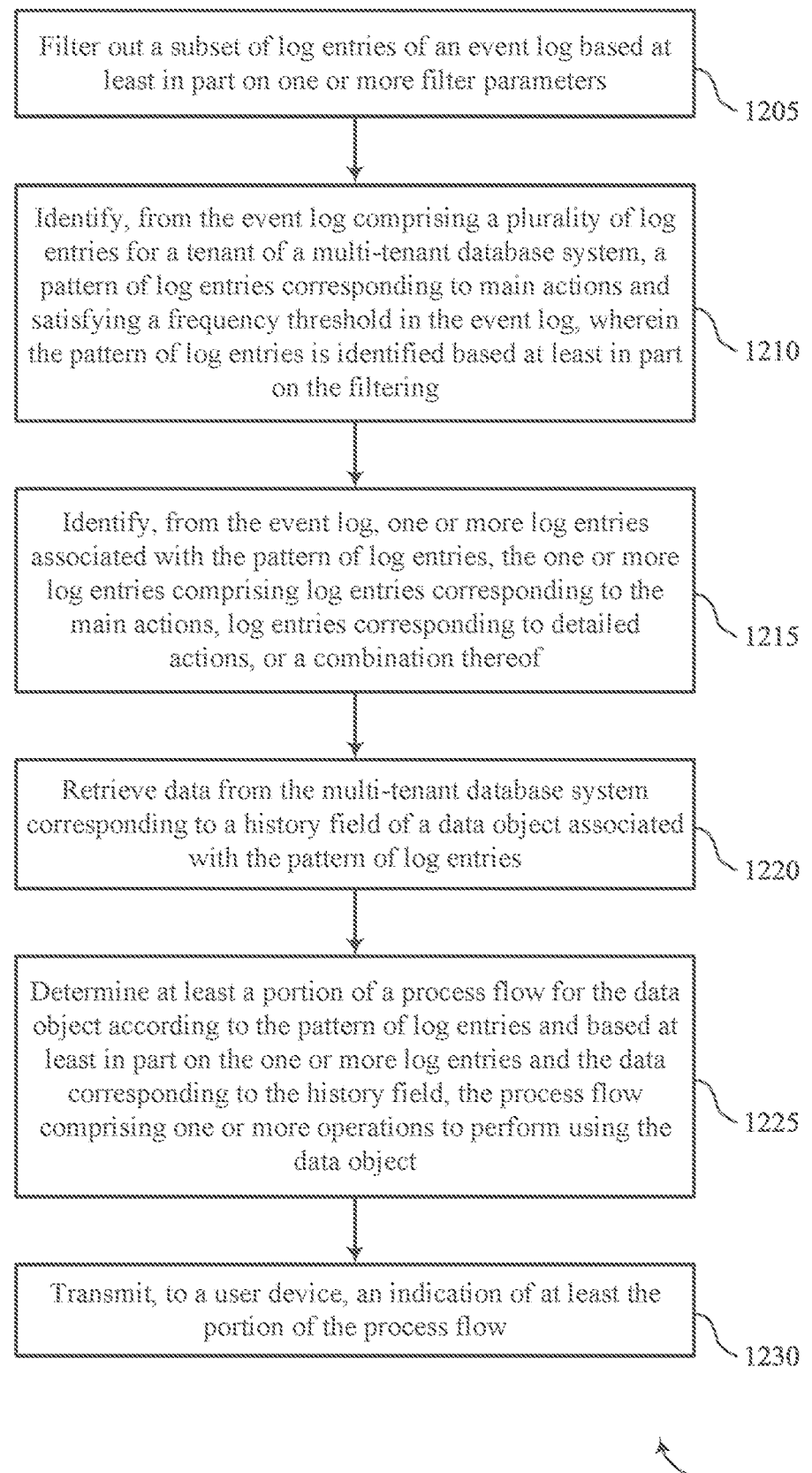

FIG. 12 shows a flowchart illustrating a method 1200 that supports automatic determination of alternative paths for a process flow using machine learning in accordance with aspects of the present disclosure. The operations of the method 1200 may be implemented by a system or its components as described herein. For example, the operations of the method 1200 may be performed by a system as described with reference to FIGS. 1 through 8. In some examples, a system may execute a set of instructions to control the functional elements of the system to perform the described functions. Additionally or alternatively, the system may perform aspects of the described functions using special-purpose hardware.

At 1205, the method may include filtering out a subset of log entries of an event log based at least in part on one or more filter parameters. The operations of 1205 may be performed in accordance with examples as disclosed herein. In some examples, aspects of the operations of 1205 may be performed by a filtering component 780 as described with reference to FIG. 7.

At 1210, the method may include identifying, from the event log comprising a plurality of log entries for a tenant of a multi-tenant database system, a pattern of log entries corresponding to main actions and satisfying a frequency threshold in the event log, wherein the pattern of log entries is identified based at least in part on the filtering (e.g., from the remaining log entries after filtering out the subset of log entries). The operations of 1210 may be performed in accordance with examples as disclosed herein. In some examples, aspects of the operations of 1210 may be performed by a pattern identification component 725 as described with reference to FIG. 7.

At 1215, the method may include identifying, from the event log, one or more log entries associated with the pattern of log entries, the one or more log entries comprising log entries corresponding to the main actions, log entries corresponding to detailed actions, or a combination thereof. The operations of 1215 may be performed in accordance with examples as disclosed herein. In some examples, aspects of the operations of 1215 may be performed by a log entry identification component 730 as described with reference to FIG. 7.

At 1220, the method may include retrieving data from the multi-tenant database system corresponding to a history field of a data object associated with the pattern of log entries. The operations of 1220 may be performed in accordance with examples as disclosed herein. In some examples, aspects of the operations of 1220 may be performed by a data retrieval component 735 as described with reference to FIG. 7.

At 1225, the method may include determining at least a portion of a process flow for the data object according to the pattern of log entries and based at least in part on the one or more log entries and the data corresponding to the history field, the process flow comprising one or more operations to perform using the data object. The operations of 1225 may be performed in accordance with examples as disclosed herein. In some examples, aspects of the operations of 1225 may be performed by a process flow determination component 740 as described with reference to FIG. 7.

At 1230, the method may include transmitting, to a user device, an indication of at least the portion of the process flow. The operations of 1230 may be performed in accordance with examples as disclosed herein. In some examples, aspects of the operations of 1230 may be performed by an indication transmission component 745 as described with reference to FIG. 7.

A method for automatic process mining is described. The method may include identifying, from an event log comprising a plurality of log entries for a tenant of a multi-tenant database system, a pattern of log entries corresponding to main actions and satisfying a frequency threshold in the event log, identifying, from the event log, one or more log entries associated with the pattern of log entries, the one or more log entries comprising log entries corresponding to the main actions, log entries corresponding to detailed actions, or a combination thereof, retrieving data from the multi-tenant database system corresponding to a history field of a data object associated with the pattern of log entries, determining at least a portion of a process flow for the data object according to the pattern of log entries and based at least in part on the one or more log entries and the data corresponding to the history field, the process flow comprising one or more operations to perform using the data object, and transmitting, to a user device, an indication of at least the portion of the process flow.

An apparatus for automatic process mining is described. The apparatus may include a processor, memory coupled with the processor, and instructions stored in the memory. The instructions may be executable by the processor to cause the apparatus to identify, from an event log comprising a plurality of log entries for a tenant of a multi-tenant database system, a pattern of log entries corresponding to main actions and satisfying a frequency threshold in the event log, identify, from the event log, one or more log entries associated with the pattern of log entries, the one or more log entries comprising log entries corresponding to the main actions, log entries corresponding to detailed actions, or a combination thereof, retrieve data from the multi-tenant database system corresponding to a history field of a data object associated with the pattern of log entries, determine at least a portion of a process flow for the data object according to the pattern of log entries and based at least in part on the one or more log entries and the data corresponding to the history field, the process flow comprising one or more operations to perform using the data object, and transmit, to a user device, an indication of at least the portion of the process flow.

Another apparatus for automatic process mining is described. The apparatus may include means for identifying, from an event log comprising a plurality of log entries for a tenant of a multi-tenant database system, a pattern of log entries corresponding to main actions and satisfying a frequency threshold in the event log, means for identifying, from the event log, one or more log entries associated with the pattern of log entries, the one or more log entries comprising log entries corresponding to the main actions, log entries corresponding to detailed actions, or a combination thereof, means for retrieving data from the multi-tenant database system corresponding to a history field of a data object associated with the pattern of log entries, means for determining at least a portion of a process flow for the data object according to the pattern of log entries and based at least in part on the one or more log entries and the data corresponding to the history field, the process flow comprising one or more operations to perform using the data object, and means for transmitting, to a user device, an indication of at least the portion of the process flow.

A non-transitory computer-readable medium storing code for automatic process mining is described. The code may include instructions executable by a processor to identify, from an event log comprising a plurality of log entries for a tenant of a multi-tenant database system, a pattern of log entries corresponding to main actions and satisfying a frequency threshold in the event log, identify, from the event log, one or more log entries associated with the pattern of log entries, the one or more log entries comprising log entries corresponding to the main actions, log entries corresponding to detailed actions, or a combination thereof, retrieve data from the multi-tenant database system corresponding to a history field of a data object associated with the pattern of log entries, determine at least a portion of a process flow for the data object according to the pattern of log entries and based at least in part on the one or more log entries and the data corresponding to the history field, the process flow comprising one or more operations to perform using the data object, and transmit, to a user device, an indication of at least the portion of the process flow.

Some examples of the method, apparatuses, and non-transitory computer-readable medium described herein may further include operations, features, means, or instructions for identifying one or more users associated with a threshold quantity or percentage of users most frequently performing events in the multi-tenant database system according to the event log, wherein the pattern of log entries may be identified from log entries associated with the identified one or more users.

Some examples of the method, apparatuses, and non-transitory computer-readable medium described herein may further include operations, features, means, or instructions for identifying one or more data object types associated with a threshold quantity or percentage of data object types most frequently corresponding to events of the log entries, wherein the pattern of log entries may be identified from log entries associated with the one or more data object types, and wherein the one or more data object types comprises the data object associated with the pattern of log entries.

Some examples of the method, apparatuses, and non-transitory computer-readable medium described herein may further include operations, features, means, or instructions for identifying the log entries corresponding to the detailed actions for the one or more log entries based at least in part on a time window corresponding to the pattern of log entries and one or more users, one or more data object types, or both associated with the log entries corresponding to the detailed actions and the log entries corresponding to the main actions.

In some examples of the method, apparatuses, and non-transitory computer-readable medium described herein, the time window starts a first threshold time before a first log entry of the pattern of log entries and ends a second threshold time after a second log entry of the pattern of log entries.

In some examples of the method, apparatuses, and non-transitory computer-readable medium described herein, the frequency threshold in the event log comprises a quantity of occurrences of a pattern within a time period.

Some examples of the method, apparatuses, and non-transitory computer-readable medium described herein may further include operations, features, means, or instructions for determining a plurality of variants corresponding to the pattern of log entries, the plurality of variants comprising one or more shared actions, one or more shared data object types, one or more shared users, or a combination thereof and selecting a variant of the plurality of variants based at least in part on a selection parameter, the selection parameter comprising a time to perform the variant, an accuracy metric associated with the variant, or both, wherein determining at least the portion of the process flow may be based at least in part on the selected variant.

Some examples of the method, apparatuses, and non-transitory computer-readable medium described herein may further include operations, features, means, or instructions for transmitting, to the user device, additional data associated with the plurality of variants, the additional data indicating respective gain information for one or more variants of the plurality of variants based at least in part on the selection parameter.

Some examples of the method, apparatuses, and non-transitory computer-readable medium described herein may further include operations, features, means, or instructions for receiving, from the user device and in response to the indication of at least the portion of the process flow, a selection of the portion of the process flow and updating the process flow at the multi-tenant database system based at least in part on the selection of the portion of the process flow.

Some examples of the method, apparatuses, and non-transitory computer-readable medium described herein may further include operations, features, means, or instructions for detecting a first action corresponding to an initial step of the process flow and performing one or more additional actions corresponding to steps of the process flow in response to detecting the first action, wherein the one or more additional actions comprises at least the portion of the process flow.

Some examples of the method, apparatuses, and non-transitory computer-readable medium described herein may further include operations, features, means, or instructions for receiving, from the user device, a request to analyze the data object, the process flow, or a combination thereof, wherein identifying the pattern of log entries may be based at least in part on the request.

Some examples of the method, apparatuses, and non-transitory computer-readable medium described herein may further include operations, features, means, or instructions for filtering out a subset of log entries of the event log based at least in part on one or more filter parameters, wherein the pattern of log entries may be identified based at least in part on the filtering.

Some examples of the method, apparatuses, and non-transitory computer-readable medium described herein may further include operations, features, means, or instructions for adding an additional action to the process flow based at least in part on determining at least the portion of the process flow.

Some examples of the method, apparatuses, and non-transitory computer-readable medium described herein may further include operations, features, means, or instructions for adding an additional path of actions to the process flow based at least in part on determining at least the portion of the process flow.

Some examples of the method, apparatuses, and non-transitory computer-readable medium described herein may further include operations, features, means, or instructions for adding the process flow to the multi-tenant database system based at least in part on determining at least the portion of the process flow.

In some examples of the method, apparatuses, and non-transitory computer-readable medium described herein, the pattern of log entries may be identified and at least the portion of the process flow may be determined internal to the multi-tenant database system, and wherein the event log and the history field of the data object may be accessed according to a security policy of the multi-tenant database system.

In some examples of the method, apparatuses, and non-transitory computer-readable medium described herein, a log entry of the event log comprises a first plurality of fields indicating a data object type, a specific data object of the data object type, a first timestamp, a first user identifier, a client session identifier, a classification, or a combination thereof and the history field of the data object comprises a second plurality of fields indicating a field of the data object, a second timestamp, a second user identifier, an original value for the field, a current value for the field, or a combination thereof.

In some examples of the method, apparatuses, and non-transitory computer-readable medium described herein, the event log tracks actions performed by a plurality of users associated with the tenant and the history field of the data object tracks actions performed on the data object, using the data object, or both.

In some examples of the method, apparatuses, and non-transitory computer-readable medium described herein, automatically updating the event log, the history field of the data object, or both based at least in part on a user performing an action in the multi-tenant database system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for automatic process mining at one or more servers, comprising:
    filtering out, for a process mining procedure, a subset of log entries corresponding to detailed actions from an event log comprising a set of log entries for a tenant of a multi-tenant database system to obtain a filtered event log;
    identifying, from the filtered event log, a pattern of log entries corresponding to main actions, the pattern of log entries comprising a plurality of first log entries performed in a specific order, wherein the pattern of log entries occurs, in the filtered event log, a quantity of times satisfying a frequency threshold for the process mining procedure;
    identifying, from the event log, a plurality of log entries associated with the identified pattern of log entries, the plurality of log entries comprising the plurality of first log entries in the identified pattern of log entries corresponding to the main actions and one or more second log entries corresponding to the detailed actions, the one or more second log entries associated with at least one of the plurality of first log entries in the identified pattern of log entries, wherein a main action comprises an action selected by a user for the multi-tenant database system to perform, and a detailed action comprises an automated action performed by the multi-tenant database system;
    retrieving data from the multi-tenant database system corresponding to a history field of a data object associated with the plurality of log entries;
    determining at least a portion of a process flow for the data object according to the identified pattern of log entries and based at least in part on the plurality of log entries and the data corresponding to the history field, the process flow comprising one or more operations to perform using the data object; and
    transmitting, to a user device, an indication of at least the portion of the process flow.

2. The method of claim 1, further comprising:
    identifying one or more users associated with a threshold quantity or percentage of users most frequently performing events in the multi-tenant database system according to the event log, wherein the pattern of log entries is identified from log entries associated with the identified one or more users.

3. The method of claim 1, further comprising:
    identifying one or more data object types associated with at least a threshold quantity or percentage of data object types most frequently corresponding to events of the set of log entries, wherein the pattern of log entries is identified from log entries associated with the one or more data object types, and wherein the one or more data object types comprises the data object associated with the plurality of log entries.

4. The method of claim 1, further comprising:
    identifying the one or more second log entries corresponding to the detailed actions for the plurality of log entries based at least in part on a time window corresponding to the identified pattern of log entries and one or more users, one or more data object types, or both associated with the one or more second log entries corresponding to the detailed actions and the plurality of first log entries corresponding to the main actions.

5. The method of claim 4, wherein the time window starts a first threshold time before a first log entry of the identified pattern of log entries and ends a second threshold time after a second log entry of the identified pattern of log entries.

6. The method of claim 1, wherein the frequency threshold for the process mining procedure comprises a quantity of occurrences of a pattern within a time period.

7. The method of claim 1, further comprising:
    determining a plurality of variants corresponding to the identified pattern of log entries, the plurality of variants comprising one or more shared actions, one or more shared data object types, one or more shared users, or a combination thereof; and
    selecting a variant of the plurality of variants based at least in part on a selection parameter, the selection parameter comprising a time to perform the variant, an accuracy metric associated with the variant, or both, wherein determining at least the portion of the process flow is based at least in part on the selected variant.

8. The method of claim 7, further comprising:
    transmitting, to the user device, additional data associated with the plurality of variants, the additional data indicating respective gain information for one or more variants of the plurality of variants based at least in part on the selection parameter.

9. The method of claim 1, further comprising:
    receiving, from the user device and in response to the indication of at least the portion of the process flow, a selection of the portion of the process flow; and updating the process flow at the multi-tenant database system based at least in part on the selection of the portion of the process flow.

10. The method of claim 9, further comprising:
detecting a first action corresponding to an initial step of the process flow; and
performing one or more additional actions corresponding to steps of the process flow in response to detecting the first action, wherein the one or more additional actions comprises at least the portion of the process flow.

11. The method of claim 1, further comprising:
receiving, from the user device, a request to analyze the data object, the process flow, or a combination thereof, wherein identifying the pattern of log entries is based at least in part on the request.

12. The method of claim 1, further comprising:
additionally filtering out a second subset of log entries from the event log based at least in part on one or more filter parameters, wherein the pattern of log entries is identified based at least in part on the additional filtering.

13. The method of claim 1, further comprising:
adding an additional action to the process flow based at least in part on determining at least the portion of the process flow.

14. The method of claim 1, further comprising:
adding an additional path of actions to the process flow based at least in part on determining at least the portion of the process flow.

15. The method of claim 1, further comprising:
adding the process flow to the multi-tenant database system based at least in part on determining at least the portion of the process flow.

16. The method of claim 1, wherein the pattern of log entries is identified and at least the portion of the process flow is determined internal to the multi-tenant database system, and wherein the event log and the history field of the data object are accessed according to a security policy of the multi-tenant database system.

17. The method of claim 1, wherein:
a log entry of the event log comprises a first plurality of fields indicating a data object type, a specific data object of the data object type, a first timestamp, a first user identifier, a client session identifier, a classification, or a combination thereof; and
the history field of the data object comprises a second plurality of fields indicating a field of the data object, a second timestamp, a second user identifier, an original value for the field, a current value for the field, or a combination thereof.

18. The method of claim 1, wherein:
the event log tracks actions performed by a plurality of users associated with the tenant; and
the history field of the data object tracks actions performed on the data object, using the data object, or both.

19. An apparatus for automatic process mining at one or more servers, comprising:
at least one processor;
at least one memory coupled with the at least one processor; and
instructions stored in the at least one memory and executable by the at least one processor to cause the apparatus to:
filter out, for a process mining procedure, a subset of log entries corresponding to detailed actions from an event log comprising a set of log entries for a tenant of a multi-tenant database system to obtain a filtered event log;
identify, from the filtered event log, a pattern of log entries corresponding to main actions, the pattern of log entries comprising a plurality of first log entries performed in a specific order, wherein the pattern of log entries occurs, in the filtered event log, a quantity of times satisfying a frequency threshold for the process mining procedure;
identify, from the event log, a plurality of log entries associated with the identified pattern of log entries, the plurality of log entries comprising the plurality of first log entries in the identified pattern of log entries corresponding to the main actions and one or more second log entries corresponding to the detailed actions, the one or more second log entries associated with at least one of the plurality of first log entries in the identified pattern of log entries, wherein a main action comprises an action selected by a user for the multi-tenant database system to perform, and a detailed action comprises an automated action performed by the multi-tenant database system;
retrieve data from the multi-tenant database system corresponding to a history field of a data object associated with the plurality of log entries;
determine at least a portion of a process flow for the data object according to the identified pattern of log entries and based at least in part on the plurality of log entries and the data corresponding to the history field, the process flow comprising one or more operations to perform using the data object; and
transmit, to a user device, an indication of at least the portion of the process flow.

20. A non-transitory computer-readable medium storing code for automatic process mining at one or more servers, the code comprising instructions executable by a processor to:
filter out, for a process mining procedure, a subset of log entries corresponding to detailed actions from an event log comprising a set of log entries for a tenant of a multi-tenant database system to obtain a filtered event log;
identify, from the filtered event log, a pattern of log entries corresponding to main actions, the pattern of log entries comprising a plurality of first log entries performed in a specific order, wherein the pattern of log entries occurs, in the filtered event log, a quantity of times satisfying a frequency threshold for the process mining procedure;
identify, from the event log, a plurality of log entries associated with the identified pattern of log entries, the plurality of log entries comprising the plurality of first log entries in the identified pattern of log entries corresponding to the main actions and one or more second log entries corresponding to the detailed actions, the one or more second log entries associated with at least one of the plurality of first log entries in the identified pattern of log entries, wherein a main action comprises an action selected by a user for the multi-tenant database system to perform, and a detailed action comprises an automated action performed by the multi-tenant database system;
retrieve data from the multi-tenant database system corresponding to a history field of a data object associated with the plurality of log entries;

determine at least a portion of a process flow for the data object according to the identified pattern of log entries and based at least in part on the plurality of log entries and the data corresponding to the history field, the process flow comprising one or more operations to perform using the data object; and transmit, to a user device, an indication of at least the portion of the process flow.

\* \* \* \* \*